United States Patent
Karpoor et al.

(10) Patent No.: US 8,521,158 B2
(45) Date of Patent: *Aug. 27, 2013

(54) WIRELESS COMMUNICATION DEVICE USING A BASE STATION RADIATED EFFECTIVE TRANSMIT POWER FOR PERFORMING AN AUTOMATIC ROAMING

(75) Inventors: Sanjaykumar S. Karpoor, Buffalo Grove, IL (US); Thomas B. Bohn, McHenry, IL (US); Dipendra M Chowdhary, Hoffman Estates, IL (US); Kevin G. Doberstein, Elmhurst, IL (US); Bradley M. Hiben, Glen Ellyn, IL (US); Bob LoGalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/956,923

(22) Filed: Nov. 30, 2010

(65) Prior Publication Data
US 2012/0135728 A1    May 31, 2012

(51) Int. Cl.
*H04W 4/00* (2009.01)
*H04B 7/00* (2006.01)

(52) U.S. Cl.
USPC ............ 455/432.1; 455/435.2; 455/434; 455/524; 455/525; 370/331; 370/332

(58) Field of Classification Search
USPC ............. 455/62, 63.1–63.2, 67.11, 418–420, 455/455/422.1, 423–425, 432.1–432.3, 434, 455/455/435.1–435.3, 436–445, 452.2, 455/453, 512–515, 517, 522–525, 550.1, 455/552.1, 556.2, 560–561, 68–69, 435.2; 370/252, 310, 328, 331–332, 338
See application file for complete search history.

(56) References Cited

U.S. PATENT DOCUMENTS

| | | | | |
|---|---|---|---|---|
| 5,257,408 A * | 10/1993 | Olson et al. | ................. | 455/67.16 |
| 5,412,658 A | 5/1995 | Arnold et al. | | |
| 5,926,762 A * | 7/1999 | Arpee et al. | ................... | 455/447 |
| 6,006,068 A * | 12/1999 | Elkin et al. | .................... | 340/7.44 |
| 6,216,001 B1 | 4/2001 | Ghirnikar et al. | | |
| 6,415,161 B1 * | 7/2002 | Fujita | ............................ | 455/561 |
| 6,504,634 B1 * | 1/2003 | Chan et al. | .................... | 398/129 |
| 7,006,483 B2 * | 2/2006 | Nelson et al. | ................. | 370/342 |
| 7,197,013 B2 | 3/2007 | Douglas et al. | | |

(Continued)

FOREIGN PATENT DOCUMENTS

| | | |
|---|---|---|
| EP | 1599062 A2 | 11/2005 |
| EP | 2012442 A1 | 1/2009 |

(Continued)

OTHER PUBLICATIONS

International Search Report and Written Opinion for International Patent Application No. PCT/US2011/058711 mailed on Jan. 30, 2012.

(Continued)

*Primary Examiner* — Meless Zewdu

(57) ABSTRACT

Methods, systems and apparatus are disclosed for using effective radiated transmit power of a base station at a wireless communication device to perform an automatic roaming method. In one implementation, the disclosed embodiments can be applied in a two-way wireless communication system.

19 Claims, 10 Drawing Sheets

(56) References Cited

U.S. PATENT DOCUMENTS

| | | | |
|---|---|---|---|
| 7,388,929 | B2 | 6/2008 | Roy |
| 7,864,899 | B2 * | 1/2011 | Huotari .................. 375/343 |
| 8,064,554 | B2 * | 11/2011 | Suzuki et al. .................. 375/348 |
| 8,126,467 | B2 * | 2/2012 | Choi et al. .................... 455/444 |
| 2002/0145968 | A1 | 10/2002 | Zhang et al. |
| 2004/0198408 | A1 * | 10/2004 | Dillon et al. .................. 455/522 |
| 2006/0088021 | A1 * | 4/2006 | Nelson et al. .................. 370/342 |
| 2008/0227405 | A1 * | 9/2008 | Harel et al. ...................... 455/69 |
| 2009/0286563 | A1 | 11/2009 | Ji et al. |
| 2011/0039550 | A1 | 2/2011 | Niki et al. |
| 2012/0135777 | A1 | 5/2012 | Karpoor et al. |

FOREIGN PATENT DOCUMENTS

| | | | |
|---|---|---|---|
| WO | 9626621 | A1 | 8/1996 |
| WO | 9943177 | A1 | 8/1999 |
| WO | 2008112849 | A2 | 9/2008 |
| WO | 2009097070 | A1 | 8/2009 |
| WO | 2009142073 | A1 | 11/2009 |

OTHER PUBLICATIONS

International Search Report and Written Opinion for related counterpart International Patent Application No. PCT/US2011/059938 mailed on Mar. 28, 2012.

Samsung: "UL Transmission Power Control in LTE-A" 3GPP Draft; R1-093395 LTE-A TPC. 3rd Generation Partnership Project (3GPP). Mobile Competence Centre ; 650. Route Des Lucioles ; F-06921 Sophia-Antipolis Cedex ; France. no. Shenzhen. China; 20090819. Aug. 19, 2009. XP050351691.

* cited by examiner

WIRELESS COMMUNICATION DEVICE USING A BASE STATION RADIATED EFFECTIVE TRANSMIT POWER FOR PERFORMING AN AUTOMATIC ROAMING

RELATED APPLICATIONS

The present application is related to the following U.S. application commonly owned with this application by Motorola Solutions, Inc.: Ser. No. 12/956,967, filed Nov. 30, 2010, titled "Methods For Using Effective Radiated Transmit Power Of A Base Station At A Wireless Communication Device To Determine Uplink Transmission Range And/Or To Adjust Transmit Power", the entire contents of which being incorporated herein by reference.

FIELD OF THE DISCLOSURE

The present disclosure relates generally to wireless communication systems, and more particularly to methods, systems and apparatus for using effective radiated transmit power of a base station at a wireless communication device to perform an automatic roaming method.

BACKGROUND

FIG. 1 is a block diagram which illustrates a wireless communication system 100. The system 100 includes a base station (BS) 130-1 that may communicate with wireless communication devices (WCD) 110 that are within downlink transmission range. The base station 130-1 may be connected to other base stations 130-2, 130-3, 130-4 via an Internet Protocol (IP) network 140 to provide wide area coverage thereby enabling the wireless communication devices 110-1, 110-2 to communicate with other wireless communication devices through other base stations 130-2, 130-3 and 130-4. Wireless communication devices 110 may roam between base stations 130-1, 130-2, 130-3 and 130-4 in order to provide mobility.

The base station 130-1 covers a certain geographic area and serves one or more wireless communication devices 110 (e.g., portable/mobile subscriber units, fixed subscriber units, and the like) that are associated with it and/or that are located within its downlink transmission range. As known in the art wireless communication devices 110 associate themselves to a particular base station by selecting the base station which produces the largest received signal strength (RSS) value. Additionally, after the association the wireless communication device 110 may exchange messages with a base station to complete a registration procedure. Generally speaking an association only method minimizes channel traffic and system complexity, while an association and registration method supports a more spectrally efficient usage of the channels in a wide area system. As used herein, the term "outbound" or "downlink" refers to a transmission path from a base station 130-1 to a wireless communication device 110. The area covered depends at least in part on the base station's transmit power. A base station 130-1 is normally capable of transmitting at much higher power than the wireless communication devices 110 and hence can cover a larger area on its downlink transmission. By contrast, the transmit power of a wireless communication device 110 is usually less than that of the base station 130-1, and therefore, the radio frequency (RF) coverage area on the uplink transmission path is limited in comparison to the downlink coverage area. As used herein, the term "inbound" or "uplink" refers to a transmission path from a wireless communication device 110 to the base station 130-1. This leads to an asymmetric transmission issue in any wireless system involving a base station 130-1 and wireless communication devices 110 that transmit at a lower power than the base station 130-1.

The base station 130-1 can be configured to transmit at different transmit power levels. In FIG. 1, constant Receive Signal Strength (RSS) contours 150, 160 are shown for two different transmit power levels of the base station 130-1. The downlink transmission range is dependent on output power level of the base station 130-1. When the base station 130-1 is configured for low power, then output power level of the inner contour 150 could be the same as that of the outer contour 160 when the base station 130-1 is configured for high power. Although the RSS contours 150, 160 are illustrated as being circular, it will be appreciated that this is done only for purposes of illustration, and that the RSS contours 150, 160 could be of any shape depending at least in part on the surrounding environment and the amount of fading the RF signal undergoes. Assuming that the transceiver and antenna characteristics of both wireless communication devices 110-1 and 110-2 are approximately the same, then the wireless communication devices 110-1 and 110-2 would observe approximately the same RSS level when on the same contour 150 or 160.

Although downlink transmissions from the base station 130-1 will often be received by both wireless communication devices 110-1, 110-2, uplink transmissions from the wireless communication device 110-2 may not be received by the base station 130-1 due to a difference in relative transmit powers. For instance, uplink transmission by the wireless communication device 110-1 on the inner contour 150 can reach the base station 130-1 since it is closer to the base station 130-1, but uplink transmission from the wireless communication device 110-2 on the outer contour 160 may not reach the base station 130-1 since its transmit power may not be adequate to reach the base station 130-1.

In other words, since base station 130-1 transmits at a relatively high power with respect to the wireless communication device, a wireless communication device 110-2 on a fringe area may be able to receive downlink (or outbound) transmissions from the base station 130-1, but its uplink (or inbound) transmissions to the base station 130-1 may not be able to reach the base station 130-1. Therefore, transmissions from the wireless communication device 110-2 may not be received by the base station 130-1. When a wireless communication device 110-2 receives downlink transmissions from the base station 130-1 with good RSS and the wireless communication device 110-2 is requested/required to transmit voice or data, the wireless communication device 110-2 will transmit on the uplink channel. However, the decision for the wireless communication device 110-2 to transmit on the channel does not take into account the ability of the wireless communication device 110-2 to communicate its uplink (or inbound) transmissions with the base station 130-1.

Techniques, such as forward error correction and diversity reception, can be implemented at the base station to improve reception of signals transmitted from the wireless communication device. However, these techniques can not be implemented in some systems because they are too processing intensive, and/or because the base station lacks multiple receiving antennas needed to implement diversity reception.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
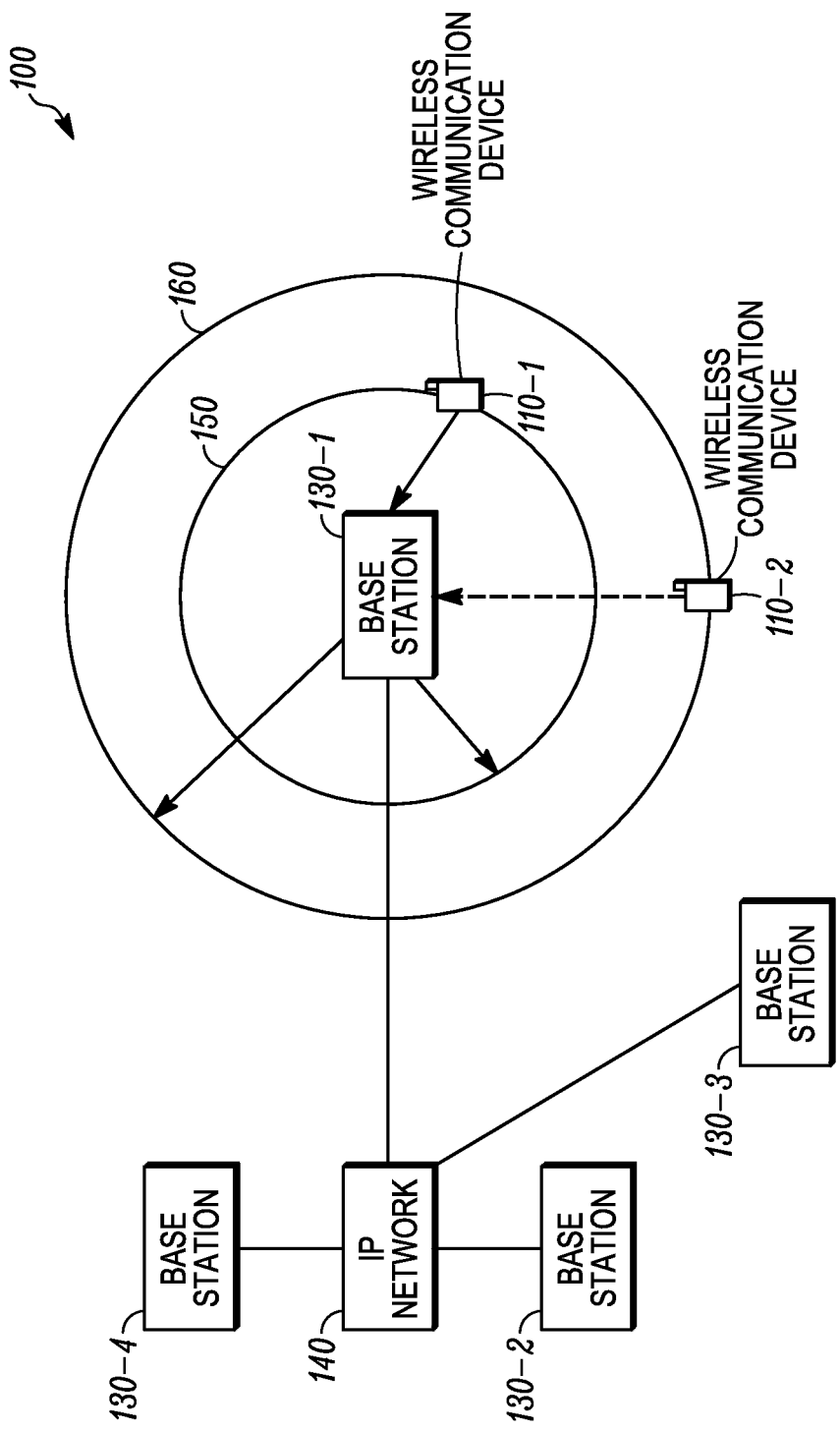
FIG. 1 is a block diagram which illustrates a wireless communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In FIG. 1, because the wireless communication device 110-2 has no way of knowing whether or not it is within uplink transmission range, there is no reason for the wireless communication device 110-2 to attempt to search for and associate with a new base station 130-2, 130-3 or 130-4. In many scenarios, the wireless communication device 110-2 will continue to attempt to transmit to the base station 130-1 at the same transmit power, and will therefore unnecessarily attempt to transmit to the base station 130-1 and can thus waste its battery resources on unsuccessful transmission attempts.

Conversely, issues can also occur when a wireless communication device 110-1, 110-2 transmits with significantly more power than is required to support communications between the wireless communication device 110-1, 110-2 and the base station 130-1. For a handheld wireless communication device 110-1, 110-2 that is powered off of a very limited capacity battery, transmissions of excess power results in quicker battery drain times and ultimately reduced battery life.

Higher than required transmit power from the wireless communication device 110-1, 110-2 can also result in interference issues on other uplink channels of different co-located communication devices such as base station receivers and other devices and thus reduce the uplink range on other channels. Interference from a transmission's modulation sidebands can reduce uplink range on the adjacent channels; typically one channel up and one channel down. Additionally, interference from multiple transmitters may combine via inter-modulation to reduce uplink range on a channel. The amount of both adjacent channel and inter-modulation interference is proportional to the wireless communications devices' power levels, thus a reduction in their power levels results in the reduction of the interfering signal levels.

In addition, this can impact other decisions that a wireless communication device makes.

In a conventional wireless communication system, the wireless communication device can determine a received signal strength (RSS) of communications it receives from the base station and also can determine its own transmit power. However, the wireless communication device does not have a way to determine the measured received signal strength (e.g., RSS) of its communications to the base station (as perceived at the base station) or the transmit power of the base station.

When the wireless communication device determines that a RSS from its current base station is below a certain threshold, the wireless communication device can perform an automatic roaming method, where the wireless communication device searches for a best base station to roam to and associate with. As used herein, the term "current base station" refers to the base station that a particular wireless communication device is currently associated with. The wireless communication device measures a RSS from each base station (e.g., that is programmed in its roam list), sorts the list of base stations based on their respective measured RSS, and roams to and associates with the base station with the highest RSS. While this approach works well in some cases, it does have some drawbacks, particularly when different base stations have different characteristics such as output power, antenna gain and combiner properties, such as evident in a real world application.

For example, although the RSS being above the threshold indicates good reception from the base station, the wireless communication device has no way to determine the quality of its uplink with the various base stations, and there is no mechanism that triggers automatic roaming when the wireless communication device cannot reach the base station. In short, the base station with best RSS value may not always be the best choice.

In some situations, the wireless communication device may not be able to successfully transmit to its current base station, but will not begin its search for a new base station (to roam to and associate with), which can lead to unsuccessful call attempts from a wireless communication device on the uplink. For example, when the wireless communication device is currently associated with a base station that is transmitting at high power, the wireless communication device may decide to stay associated with that base station and not start auto roaming even though the wireless communication device is far away and can not successfully transmit to the associated base station. In other situations, the wireless communication device may incorrectly select a new base station to roam to and associate with since the wireless communication device is basing its selection solely on downlink RSS, and is not considering whether its uplink transmission power is adequate for the base station to receive transmissions from the wireless communication device. For example, even when the wireless communication device does roam to and associate with a new base station, there is no way to determine when the wireless communication device has an adequate uplink to the new base station unless a registration process is required.

In some situations where association without registration is the preferred method, the wireless communication device might roam to and associate with a new base station with which it continues to have poor uplink coverage. In some situations where association with registration is the preferred method, the wireless communication device might associate with a new base station with poor uplink coverage, but be unable to register, thus reducing battery life with wasted transmissions and prolonging the time to successfully register with a base station with good uplink coverage.

It would be desirable to provide wireless communication systems, methods and apparatus that can be used to address problems caused by differences in transmission power of a base station and a wireless communication device served by those base stations. It would also be desirable for the wireless communication device to determine when it is out of transmission range of the base station that it is currently associated with. It would also be desirable to keep the wireless communication device from transmitting excessive power to improve battery life and reduce interference issues.

Methods, systems and apparatus are disclosed for determining radio frequency (RF) distance between a wireless communication device and a base station. The RF distance, unlike physical distance, takes into account the transmit power of the base station, the transmit power of the wireless communication device, and fading characteristics of the uplink communication path to help determine whether the wireless communication device can reach the base station on its uplink transmissions. The wireless communication device can determine, based on the effective radiated transmit power of the base station, the received signal strength (e.g., RSS) of its communications to the base station (as perceived at the base station). These variables can then be used by the wireless communication device to determine whether it is within uplink transmission range of the base station. The measured signal strength and other variables transmitted by the base station for example in a beacon can also be used for a variety of other purposes that will be described below.

In accordance with some of the disclosed embodiments, a method is provided for determining whether a wireless communication device is within uplink transmission range of a base station and/or adjusting actual transmit power (Pwcd) of the wireless communication device.

In accordance with some of the disclosed embodiments, the actual transmit power (Pwcd) of a wireless communication device can initially be set to its highest rated transmit power (Phigh) value. When a beacon is received from the current base station, the wireless communication device can compute an estimated uplink received signal strength (RSSbs) value for the base station based on effective radiated power (Pbseff) information received in the beacon. For example, in one embodiment, when the beacon is received from the current base station, the wireless communication device can compute an estimated uplink received signal strength (RSSbs) value for the base station based on effective radiated power (Pbseff) information received in the beacon, a value of RSS measured by the wireless communication device for that base station, and an actual transmit power (Pwcd) of the wireless communication device.

The estimated uplink received signal strength (RSSbs) is the received signal strength that the base station would measure for signals received from the wireless communication device. The wireless communication device can also determine a minimum uplink RSS threshold value (RSSthresh_Min) required at the base station from the beacon. The wireless communication device can also determine whether the estimated uplink received signal strength (RSSbs) is greater than the minimum uplink RSS threshold value (RSSthresh_Min) required at the base station. When the wireless communication device determines that the estimated uplink received signal strength (RSSbs) measured at the base station is greater than the minimum uplink RSS threshold value (RSSthresh_Min), the wireless communication device can determine that it is within uplink transmission range of the base station. By contrast, when the wireless communication device determines that a beacon was not received from the base station or that the estimated uplink received signal strength (RSSbs) is not greater than the minimum uplink RSS (RSSthresh_Min), the wireless communication device can determine that it is outside of uplink transmission range to the base station. In some implementations, the wireless communication device can then provide an indication that the wireless communication device is outside of uplink transmission range to the base station.

In accordance with some of the disclosed embodiments, when the wireless communication device determines that the actual transmit power (Pwcd) of the wireless communication device is not set to the highest rated transmit power (Phigh) value for the wireless communication device and that the estimated uplink received signal strength is below the minimum uplink RSS threshold value (RSSthresh_min), the wireless communication device can set its actual transmit power (Pwcd) to the highest rated transmit power (Phigh) value for the wireless communication device. When the estimated uplink received signal strength is still below the minimum uplink RSS threshold value (RSSthresh_min) and automatic roaming is enabled in the wireless communication device, the wireless communication device starts the automatic roaming procedure. When automatic roaming is enabled, the wireless communication device can set its actual transmit power (Pwcd) of the wireless communication device to its highest rated transmit power (Phigh) value, and begin sequentially scanning for all base stations. The base stations scanned for can be all base station in the network or all base stations specified in a search list that is stored at the wireless communication device. Each time the wireless communication device receives a beacon from any of the base stations it can determine (e.g., measure or compute) a downlink RSS value for each base station that a beacon is received from, update effective radiated power (Pbseff) information and other parameters for each base station based on information transmitted in the beacon. The other parameters comprise an optimum uplink RSS threshold value (RSSthresh_Opt), a minimum uplink RSS threshold value (RSSthresh_Min), and/or a minimum uplink RSS automatic roaming threshold value (RSSauto-roam) required by the wireless communication device to stay associated with the base station. The wireless communication device can then compute an estimated uplink received signal strength (RSSbs) for each particular base station based on effective radiated power (Pbseff) information for that particular base station that was received in the beacon from that particular base station, and then compute a normalized RSS value for each particular base station by determining a difference between the estimated uplink received signal strength (RSSbs) for that particular base station and a minimum downlink RSS automatic roaming threshold value (RSSauto-roam) required by the wireless communication device. The wireless communication device stores a normalized RSS value for each particular base station in a normalized RSS list.

When all base stations specified have been scanned for, the wireless communication device can prioritize or order the base stations in the descending order (e.g., from highest normalized RSS value to lowest normalized RSS value) in a normalized RSS sort list, and then select the one base station that has the highest normalized RSS value from the normalized RSS sort list as the new base station the wireless communication device will roam to and associate with.

In some embodiments, in which power control techniques are implemented, after determining that the estimated uplink received signal strength (RSSbs) at the current base station is greater than or equal to the optimum uplink RSS threshold value (RSSthresh_Opt) at the current base station, the wireless communication device can then determine whether actual transmit power (Pwcd) of the wireless communication device is greater than or equal to the lowest rated transmit power (Plow) value for the wireless communication device.

When the wireless communication device determines that actual transmit power (Pwcd) of the wireless communication device is greater than the lowest rated transmit power (Plow) value for the wireless communication device, the wireless communication device can then decrease actual transmit power (Pwcd) by an increment (Pincr). By contrast, when the wireless communication device determines that actual transmit power (Pwcd) of the wireless communication device is equal to the lowest rated transmit power (Plow) value for the wireless communication device, the wireless communication device can then continue to receive beacons from the base station.

After determining that the estimated uplink received signal strength (RSSbs) at the current base station is less than the optimum uplink RSS threshold value (RSSthresh_Opt) at the current base station, the wireless communication device can then determine whether actual transmit power (Pwcd) of the wireless communication device is less than the highest rated transmit power (Phigh) value for the wireless communication device.

When the wireless communication device determines that actual transmit power (Pwcd) of the wireless communication device is less than the highest rated transmit power (Phigh) value for the wireless communication device, the wireless communication device can increase actual transmit power (Pwcd) by an increment (Pincr).

When the wireless communication device determines that actual transmit power (Pwcd) of the wireless communication device is equal to the highest rated transmit power (Phigh) value for the wireless communication device, the wireless communication device can then determine whether automatic roaming is enabled. When the wireless communication device determines that automatic roaming is not enabled, the wireless communication device can continue to receive beacons from the current base station. When the wireless communication device determines that automatic roaming is enabled, the wireless communication device can determine whether the estimated uplink received signal strength (RSSbs) at the current base station is greater than or equal to a minimum uplink RSS automatic roaming threshold value (RSSauto-roam) required by the wireless communication device to stay with its current base station.

When the wireless communication device determines that the estimated uplink received signal strength (RSSbs) at the current base station is greater than or equal to the minimum uplink RSS automatic roaming threshold value (RSSauto-roam), the wireless communication device can continue to receive beacons from the base station. When the wireless communication device determines that the estimated uplink received signal strength (RSSbs) at the current base station is less than the minimum uplink RSS automatic roaming threshold value (RSSauto-roam), the wireless communication device can set the actual transmit power (Pwcd) of the wireless communication device equal to the highest rated transmit power (Phigh) value for the wireless communication device and begin an automatic roaming procedure.

Embodiments of the present invention can apply to a variety of wireless communication networks and a variety of different network configurations. The disclosed embodiments can generally be implemented in any type of wireless communication system in which asymmetric transmit power is an issue (e.g., in which transmit power of the wireless communication device on the uplink transmission path is limited with respect to the transmit power of the base station on the downlink path). The disclosed embodiments can be implemented in wireless communication systems that include at least one base station and at least one wireless communication device. Examples of such wireless communication systems include two-way wireless communication systems, such as, a conventional or trunked two-way radio system. Prior to describing some embodiments with reference to FIGS. 5-9C, one non-limiting example of a wireless communication system in which these embodiments can be implemented will be described with reference to FIG. 2.

Figure 2:
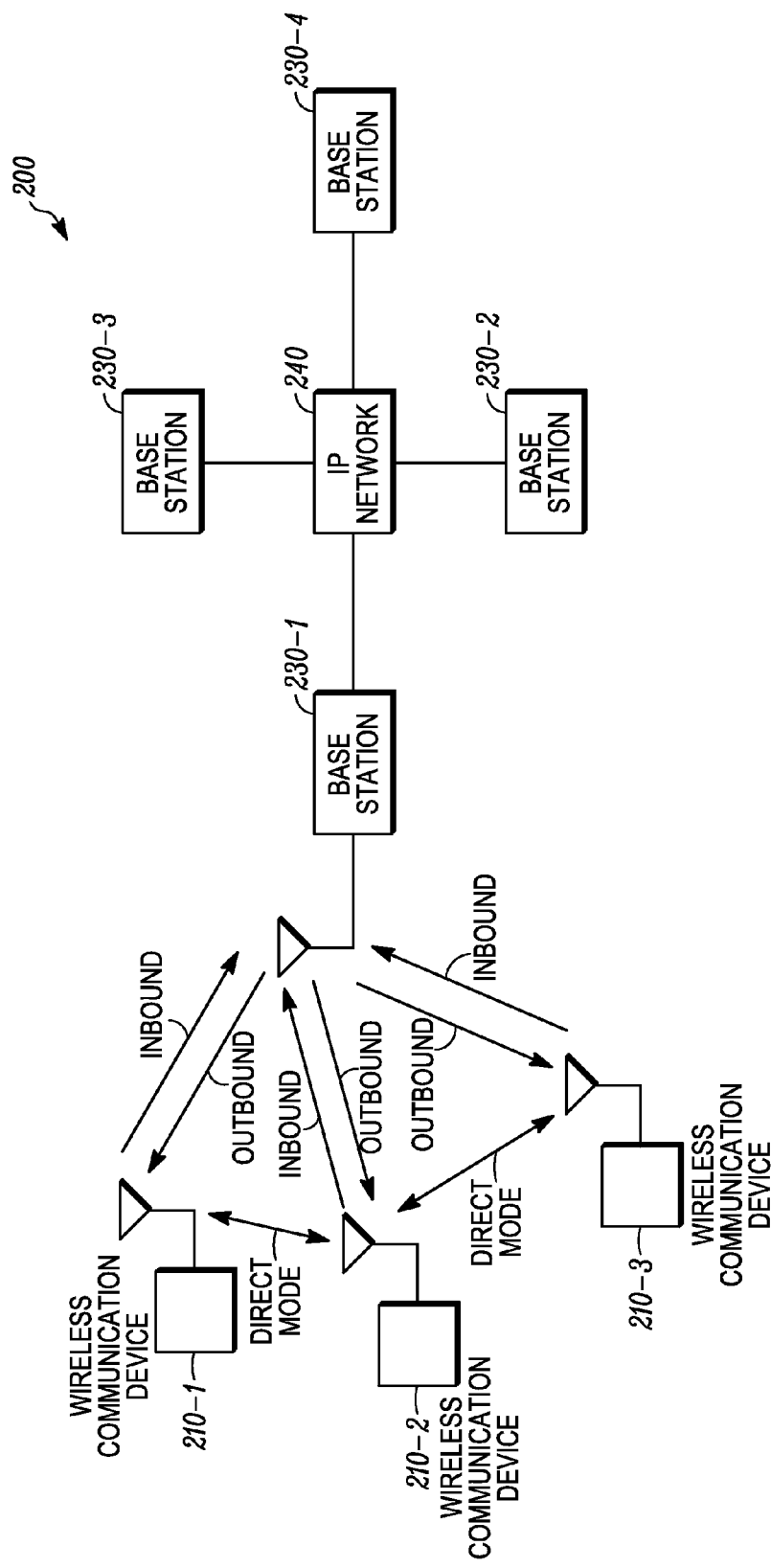
FIG. 2 is a block diagram which illustrates a wireless communications system in which the various disclosed embodiments can be implemented.

FIG. 2 is a block diagram which illustrates a wireless communications system 200 in which the various disclosed embodiments can be implemented.

As illustrated in FIG. 2, the system 200 may include at least one base station 230-1 that is communicatively coupled to an Internet Protocol (IP) network 240 via a communication link, and a plurality of wireless communication devices (WCDs) 210-1, 210-2, 210-3. In one implementation, the communication link can be an Internet Protocol (IP) based communication link for transferring information between the base station 230-1 and other the base stations 230-2, 230-3, 230-4. The system 200 illustrated in FIG. 2 is a simplified representation of one particular network configuration, and many other network configurations are possible. Although not illustrated in FIG. 2, it will be appreciated by those skilled in the art that the network can include additional base stations and/or additional wireless communication devices that are not illustrated for sake of convenience. For ease of illustration, only three wireless communication devices and only four base stations 230 are shown. However, those skilled in the art will appreciate that a typical system can include any number of wireless communication devices and any number of base stations distributed about in any configuration, where the base stations are communicatively coupled to one another via IP network 240. It will be appreciated by those of ordinary skill in the art that the base stations 230 and the wireless communication devices 210 can be, for example, part of a wide area network (WAN) that is distributed over a wide area that spans multiple access networks.

Examples of such wireless communication systems 200 include two-way radio communication systems that are described in a number of standards that relate to digital two-way radio systems. Examples of such standards include, the Terrestrial Trunked Radio (TETRA) Standard of the European Telecommunications Standards Institute (ETSI), Project 25 of the Telecommunications Industry Association (TIA) and ETSI's digital mobile radio (DMR) Tier-2 Standard, which are incorporated by reference herein in their entirety. The TETRA standard is digital standard used to support multiple communication groups on multiple frequencies, including one-to-one, one-to-many and many-to-many calls. The ETSI DMR Tier-2 standard is yet another digital radio standard that describes such two-way peer-to-peer communication system. The TETRA standards and DMR standards have been and are currently being developed by the European Telecommunications Standards Institute (ETSI). Any of the TETRA standards or specifications or DMR standards or specifications referred to herein may be obtained by contacting ETSI at ETSI Secretariat, 650, route des Lucioles, 06921 Sophia-Antipolis Cedex, FRANCE. Project 25 defines similar capabilities, and is typically referred to as Project 25 Phase I and Phase II. Project 25 (P25) or APCO-25 refer to a suite of standards for digital radio communications for use by federal, state/province and local public safety agencies in North America to enable them to communicate with other agencies and mutual aid response teams in emergencies. The Project 25 (P25) specifies standards for the manufacturing of interoperable digital two-way wireless communications products. Developed in North America under state, local and federal representatives and Telecommunications Industry Association (TIA) governance, P25 is gaining worldwide acceptance for public safety, security, public service, and commercial applications. The published P25 standards suite is administered by the Telecommunications Industry Association (TIA Mobile and Personal Private Radio Standards Committee TR-8). Any of the P25 standards or specifications referred to herein may be obtained at TIA, 2500 Wilson Boulevard, Suite 300, Arlington, Va. 22201.

Each of the illustrated wireless communication devices 210, may be, for example, a portable/mobile radio, a personal digital assistant, a cellular telephone, a video terminal, a portable/mobile computer with a wireless modem, or any other wireless communication device. For purposes of the following discussions, the wireless communication devices 210 will be referred to as "wireless communication devices" herein, but they are also referred to in the art as subscriber units, mobile radios, mobile stations, mobile equipment, handsets, mobile subscribers, or an equivalent.

As illustrated, for example, the wireless communication devices 210 communicate over inbound and outbound wireless communication links with base station 230-1. The base station 230-1 may also be referred to as a base radio, repeater, access point, or an equivalent. The base station 230-1 includes, at a minimum, a repeater and a switch/router and can also include other elements to facilitate the communications between wireless communication devices 210 and an Internet Protocol (IP) network 240.

In some implementations, the wireless communication devices 210-1, 210-2, 210-3 can communicate with each other through base station 230-1. As is known by one of ordinary skill in the art, a base station generally comprises one or more repeater devices that can receive a signal from a transmitting wireless communication device over one wireless link and re-transmit to listening wireless communication devices over different wireless links. As used herein, the term "uplink" or "inbound" refer to a communication originating from a wireless communication device that is destined for a base station, whereas the term "downlink" or "outbound" refers to a communication originating from a base station that is destined for a wireless communication device. For example, wireless communication device 210-1 can transmit over an inbound wireless link to base station 230-1 and base station 230-1 can re-transmit the signal to listening wireless communication devices such as wireless communication devices 210-2, 210-3 over an outbound wireless link. In addition, wireless communication devices 210-1, 210-2, 210-3 may communicate with the other wireless communication devices (not shown) that are located in other "sites" or "zones."

Moreover, although communication between wireless communication devices can be facilitated by base station 230-1, in some implementations the wireless communication devices 210 can communicate directly with each other when they are in communication range of each other using a direct mode (also known as talk-around mode) of operation without assistance of a base station. When communicating direct mode, the wireless communication devices 210 communicate directly with each other using timeslots normally reserved for outbound communications.

Each wireless communication device 210-1, 210-2, 210-3 can belong to a one or more communication groups which has its own communication group identifier. Each of the members of a particular communication group share a communication group identifier that distinguishes those wireless communication devices from other wireless communication devices in the network that do not belong to the communication group. The wireless communication devices belonging to a particular communication group are authorized to receive communications intended for that particular communication group, and/or to transmit communications intended for that particular communication group.

Figure 3:
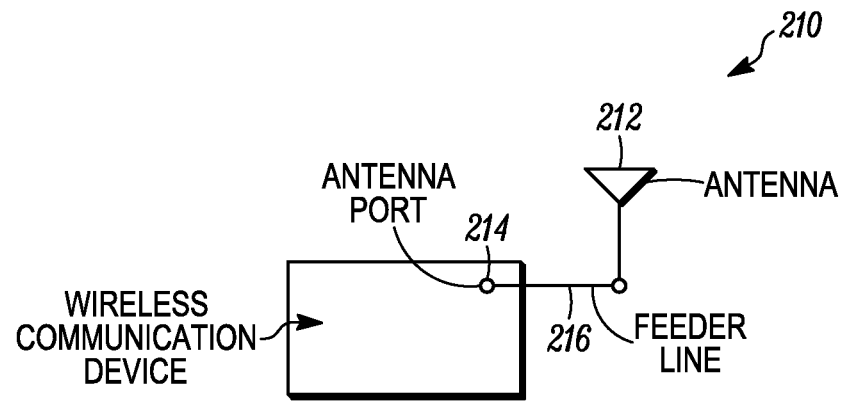
FIG. 3 is a simplified block diagram of a wireless communication device of FIG. 2.
Figure 4:
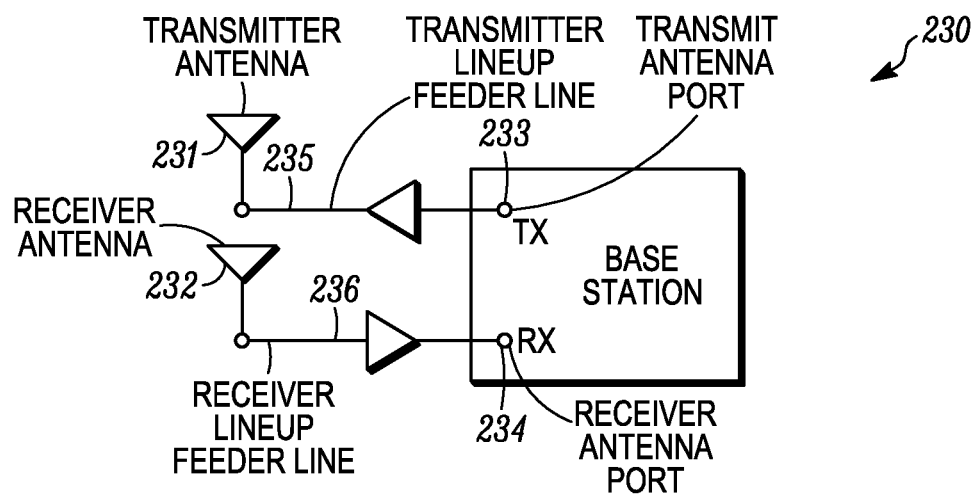
FIG. 4 is a simplified block diagram of a base station of FIG. 2.

FIG. 3 is a simplified block diagram of some features of a wireless communication device 210. The wireless communication device 210 can include at least one antenna 212 that is coupled to an antenna port 214 by a feeder line 216. FIG. 4 is a simplified block diagram of some features of a base station 230. The base station 230 include a transmitter path that includes at least one transmitter antenna 231 that is coupled to a transmit antenna port 233 by a transmit lineup feeder line 235, and a receiver path that includes at least one receiver antenna 232 that is coupled to a receiver antenna port 234 by a receiver lineup feeder line 236. These features are understood by those skilled in the art and will be referred to in the description below.

Although not illustrated, those skilled in the art will appreciate that the wireless communication devices 210-1, 210-2, 210-3 and the base station 230-1 each comprise a radio unit that includes a processor and a transceiver. Each transceiver includes a transmitter and a receiver for transmitting and receiving radio frequency (RF) signals, respectively. Typically, both the wireless communication devices and the base stations, further comprise one or more processing devices (such as microprocessors, digital signal processors, customized processors, field programmable gate arrays (FPGAs), unique stored program instructions (including both software and firmware), state machines, and the like.) and memory elements for performing (among other functionality) the air interface protocol and channel access scheme supported by system 200. As will be described below, using these protocols, wireless communication devices can each generate RF signals that are modulated with information for transmission to the other wireless communication devices or to the base stations.

In one implementation of the system 200, the base station 230-1 and wireless communication devices 210 can communicate with one another using an inbound 25 kilo Hertz (kHz) frequency band or channel and an outbound 25 kHz frequency band or channel. In other implementations, inbound and outbound channels have a different bandwidth (e.g., 12.5 kHz, 6.25 kHz, etc) can be implemented.

Those skilled in the art will appreciate that the base stations and wireless communication devices may communicate with one another using a variety of air interface protocols or channel access schemes. For example, it may be desirable to improve or increase "spectral efficiency" of such systems so that more end-users can communicate more information in a given slice of RF spectrum. Thus, in some two-way digital radio systems, a particular channel, such as the 25 kHz channel described above, that historically carried a single call at a given time can be divided to allow for a single channel to carry two (or more) calls at the same time. For example, in the context of one implementation described above, for instance, the 25 kHz inbound and outbound sub-channels can be further divided using either Time-Division Multiple Access (TDMA) multiple access technologies to increase the number of wireless communication devices that can simultaneously utilize those sub-channels. As will be described below, the disclosed embodiments can apply to any wireless communication system that implements a multiple access scheme that employs a frame structure which includes two or more timeslots, including narrowband digital two-way radio wireless communication systems as described below.

For example, TDMA preserves the full channel width, but divides a channel into alternating time slots that can each carry an individual call. Examples of radio systems that utilize TDMA include those specified in the Terrestrial Trunked Radio (TETRA) Standard, the Telecommunications Industry Association (TIA) Project Phase II 25 Standard, and the European Telecommunications Standards Institute's (ETSI) Digital Mobile Radio (DMR) standard. Project 25 Phase II and the ETSI DMR Tier-2 standard implement two-slot TDMA in 12.5 kHz channels, whereas the TETRA standard that uses four-slot TDMA in 25 kHz channels.

For instance, a 12.5 kHz inbound sub-channel can be further divided into two alternating time slots so that a particular wireless communication device can use the entire 12.5 kHz inbound sub-channel during a first time slot to communicate with the base station, and another wireless communication device can use the entire 12.5 kHz inbound sub-channel during a second time slot to communicate with the base station. Similarly, use of the 12.5 kHz outbound sub-channel can also be divided into two alternating time slots so that the particular base station can use the entire 12.5 kHz outbound sub-channel to communicate with a particular wireless communication device (or communication group of wireless communication devices) during a first time slot, and can use the entire 12.5 kHz outbound sub-channel to communicate with another particular wireless communication device (or another communication group of wireless communication devices) during a second time slot. As one example, Project 25 Phase 2 TDMA uses twelve (12) 30 millisecond time slots in each super-frame. Each time slot has a duration of 30 milliseconds and represents 360 bits.

Project 25 Phase 2 TDMA uses two different modulation schemes to modulate data streams for over-the-air transmission in a 12.5 kHz channel. The first scheme, called harmonized continuous phase modulation (H-CPM), is used by the wireless communication devices for uplink inbound transmission. H-CPM is a common constant-envelope modulation technique. The second scheme, called harmonized differential quadrature phase shift keyed modulation (H-DQPSK), is used at base stations for downlink outbound transmissions. H-DQPSK is a non-coherent modulation technique that splits the information stream into two channels, delays one channel by 90° in phase (quadrature) and then recombines the two phase shift keyed channels using differential coding (encoding the difference of the current data word applied to the transmitter with its delayed output). Combining two channels in quadrature (again, 90° out of phase with each other) lowers the transmitted baud rate, improving the transmitted spectral characteristics. H-DQPSK modulation requires linear amplifiers at the base station.

Regardless of the multiple access technique that is implemented, the RF resources available for communicating between a base station and its associated wireless communication devices are limited. One example of an RF resource is a time slot in Time Division Multiple Access (TDMA)-based systems, and another example is a frequency sub-channel within a particular time slot in Orthogonal Frequency Division Multiple Access (OFDMA)-based systems. At any given time, a single RF resource can be allocated to either a communication group (e.g., one wireless communication device communicating with two or more other wireless communication devices) or a communication pair (e.g., two wireless communication devices communicating only with each other).

Terminology

Prior to describing the disclosed embodiments in detail, terminology that is referred to throughout the remainder of description will be defined.

As used herein, "transmit power (Pwcd)" refers to transmit power, as measured at the transmit antenna port of a wireless communication device in decibel referenced to milliwatt (dBm). A wireless communication device can determine its transmit power (Pwcd) by programming or actual measurement. When the wireless communication device only has one antenna port, then that single antenna port is the transmit antenna port. As used herein, the value "Plow" refers to the lowest rated transmit power of the wireless communication device, the value "Phigh" refers to the highest rated transmit power of the wireless communication device and the value "Pincr" refers to the power step increment of the wireless communication device.

As used herein, "transmit power (Pbs)" refers to transmit power, as measured at the transmit antenna port of the base station in dBm. A base station can determine its transmit power by actual measurement or programming.

As used herein, "RSSwcd" refers to a downlink Received Signal Strength (RSS) measured by the wireless communication device and referenced to the receive antenna port, in dBm for a communication received from a base station. When the wireless communication device only has one antenna port, then that single antenna port is the receive antenna port. The measured downlink RSSwcd value can be positive or negative value. Several variables or parameters affect the downlink received signal strength (RSSwcd) measured by the wireless communication device including (1) the transmit power of the base station (Pbs), (2) attenuation/amplification between the base station transmit antenna port and the base station transmit antenna, (3) the gain of the base station transmit antenna, (4) the physical height of the base station transmit antenna (e.g., Height Above Average Terrain (HAAT)), (5) over-the-air (OTA) multipath fading from base station to the wireless communication device, (6) the physical height of the receive antenna of the wireless communication device, (7) the gain of the wireless communication device receive antenna and (8) amplification/attenuation between the wireless communication device antenna and the wireless communication device receive antenna port. Parameters (4), (5) and (6) are parameters that impact downlink path loss between the base station transmit antenna and the wireless communication device receive antenna.

As used herein, the value "RSSbs" refers to an uplink Received Signal Strength (in dBm) measured by the base station receiver and referenced to the antenna port for a communication received from a wireless communication device. The uplink RSSbs value can be positive or negative value. Several variables or parameters affect the uplink received signal strength (RSSbs) measured by the base station including (11) the transmit power of the wireless communication device (Pwcd), (12) attenuation/amplification between the wireless communication device transmit antenna port and the wireless communication device transmit antenna, (13) the gain of the wireless communication device transmit antenna, (14) the physical height of the wireless communication device transmit antenna above the ground, (15) over-the-air (OTA) multipath fading from wireless communication device to the base station, (16) the physical height of the receive antenna of the base station, (17) the gain of the base station receive antenna and (18) amplification/attenuation between the base station antenna and the base station receive antenna port. Parameters (14), (15) and (16) are parameters that impact uplink path loss between the wireless communication device transmit antenna and the base station receive antenna.

A wireless communication device can estimate RSSbs based on equation (1) as follows:

$$RSSbs = RSSwcd + Pwcd + Kul - Pbs - Kdl \quad (1)$$

As used herein, the value "Kul" is an uplink system gain (Kul) that refers to a system gain of the wireless communication system measured in dB of the uplink path. As used herein, the value "Kdl" is a downlink system gain (Kdl) that refers to a system gain of the wireless communication system measured in dB of the downlink path. The system gain of the uplink path (Kul) can be determined based on parameters (12) through (18) and the system gain of the downlink path (Kdl) can be determined based on parameters (2)-(8). Both uplink system gain (Kul) and downlink system gain (Kdl) can be different at different base stations based, for example, on site configuration and licensing power restrictions.

The wireless communication device has available or can measure values for RSSwcd, and Pwcd. The value of Pbs is sent over the air by a particular base station. The wireless communication device can determine uplink system gain (Kul) and downlink system gain (Kdl) from a combination of available values and values transmitted over the air by a particular base station. The RSSbs reflects an estimate of uplink RSS at the base station receive antenna port when signals are transmitted by the wireless communication device, and thus allows the wireless communication device to determine the received signal strength at the base station for transmissions received from the wireless communication device. Several variables or parameters affect the estimated uplink received signal strength (RSSbs) that will be observed or perceived at the base station for communications received from a wireless communication device.

Parameters that Impact Wireless Communication Device Estimate of RSSbs

The wireless communication device uses the following parameters (1) through (16) to estimate RSSbs at the receive antenna port of the base station, (1) the transmit power of the base station (Pbs), (2) attenuation/amplification between the base station transmit antenna port and the base station transmit antenna, (3) the gain of the base station transmit antenna, (4) the physical height of the base station transmit antenna, (5) over-the-air (OTA) multipath fading from base station to the wireless communication device, (6) the physical height of the receive antenna of the wireless communication device, (7) the gain of the wireless communication device receive antenna and (8) amplification/attenuation between the wireless communication device antenna and the wireless communication device receive antenna port (11) the transmit power of the wireless communication device (Pwcd), (12) attenuation/amplification between the wireless communication device transmit antenna port and the wireless communication device transmit antenna, (13) the gain of the wireless communication device transmit antenna, (14) the physical height of the wireless communication device transmit antenna, (15) over-the-air (OTA) multipath fading from wireless communication device to the base station, (16) the physical height of the receive antenna of the base station, (17) the gain of the base station receive antenna and (18) amplification/attenuation between the base station antenna and the base station receive antenna port.

Of these parameters, the wireless communication device knows (7) the gain of the wireless communication device receive antenna, (8) amplification/attenuation between the wireless communication device antenna and the wireless communication receive antenna port, its own (9) transmit power (Pwcd), (10) attenuation/amplification between the wireless communication device transmit antenna port and the wireless communication device transmit antenna, (11) the gain of the wireless communication device transmit antenna)—at any given time.

In many practical applications, the wireless communication device utilizes the same antenna for both transmitting and receiving. In these instances items (7) the gain of the wireless communication device receive antenna and (11) the gain of the wireless communication device transmit antenna, are the same, and (8) amplification/attenuation between the wireless communication device antenna and the wireless communication device receive antenna port and (10) attenuation/amplification between the wireless communication device transmit antenna port and the wireless communication device transmit antenna are the same. Since these items are the same, they cancel each other out and would not be required in a method to estimate RSSbs. In these instances the transmit power of the wireless communication device (9) is the only wireless communication parameter that needs to be known by the wireless communication device.

In most cases the downlink path loss, which incorporates (4) the physical height of the base station transmit antenna, (5) over-the-air (OTA) multipath fading from base station to the wireless communication device and (6) the physical height of the receive antenna of the wireless communication device and the uplink path loss, which incorporates (12) the physical height of the wireless communication device transmit antenna, (13) over-the-air (OTA) multipath fading from wireless communication device to the base station and (14) the physical height of the receive antenna of the base station are the same. In these instance items (4) through (6) and items (12) through (14) cancel each other out and are not required to be known. For simplicity this canceling effect is assumed in some non-limiting implementations. In other non-limiting implementations the difference can be defined as a gain or loss difference in dB that can be preprogrammed in the wireless communication device or transmitted from the base station in a beacon.

In accordance with the disclosed embodiments, the base station communicates parameters (1) through (6) and (12) through (16) to the wireless communication device. How parameters (1) through (6) and (12) through (16) are communicated to the wireless communication devices can vary depending on the implementation.

In some implementations, the base station communicates parameters (1) through (6) and (12) through (16) individually to the wireless communication device.

Base Station Configurable Parameters:

In some other implementations, various ones of the other parameters can be configured at the base station a priori. For instance, in one implementation, Customer Programming Software (CPS) can be used to configure the following parameters at the base station:

(1) transmit power (Pbs) of the base station (e.g., the transmit power of the base station's at the transmitter antenna port can be configured in dBm);

the gain ratio of (3) the base station's transmit antenna and (15) the base stations' receive antenna;

(2) base station transmit feeder gain (BS Tx Feeder Gain); and

(16) base station receive feeder gain (BS Rx Feeder Gain).

The gain ratio of the base station's transmit and receive antennas can vary widely depending on the particular implementation of the base station. The transmit/receive antenna gain ratio can be configured in dB as the difference in dB between the transmit gain and the receive gain due to antenna configuration. For example, in one implementation, when the antenna configuration yields 1 dB more transmit gain than receive gain, then a transmit/receive antenna gain ratio of +1 could be configured at the base station. When the antenna configuration yields 1 dB of receive gain more than transmit gain, then a transmit/receive antenna gain ratio of −1 could be configured at base station. When details regarding gain associated with a particular antenna configuration are not known or the gain is the same for both antennas, then a transmit/receive antenna gain ratio of zero (0) could be configured at a base station.

The base station transmit feeder gain (BS Tx Feeder Gain) specifies attenuation/amplification between a transmit port of the base station's transmitter and transmit antenna input of the base station. The base station transmit feeder gain (BS Tx Feeder Gain) can be caused by components (e.g., attenuators, amplifiers, combiners, and the like.) in the path between the base station transmit antenna port and the transmit antenna. The base station transmit feeder gain (BS Tx Feeder Gain) can be configured as a negative dB value when the components cause attenuation, or as a positive dB value when the components cause amplification, or as zero (0) dB value for a default setting.

The base station receive feeder gain (BS Rx Feeder Gain) specifies attenuation/amplification between the receive antenna and a receive port of the receiver of the base station. The base station receive feeder gain (BS Rx Feeder Gain) can be caused by components (e.g., attenuators, amplifiers, combiners, and the like) in the path between the receiver and the receive antenna. The base station receive feeder gain (BS Rx Feeder Gain) can be configured as a negative dB value when the components cause attenuation, or as a positive dB value when the components cause amplification, or as zero (0) dB value for a default setting.

By configuring these parameters at the base station a priori, the base station can compute and communicate one consolidated parameter, referred to herein as the effective radiated power (Pbseff) of the base station, to the wireless communication device that represents parameters (1) through (6) and (12) through (16) above.

Effective Radiated Power (Pbseff) of the Base Station

The effective radiated power (Pbseff) of the base station converts transmit power (Pbs) and transmit (TX) and receive (RX) infrastructure gains/losses into an effective power transmitted out of antenna in a given direction. The effective radiated power (Pbseff) of the base station takes into account not only the transmit power (Pbs), but the gain of the antenna TX and RX antennas, the TX feeder gain and the RX feeder gain. For example, in some embodiments, the base station may compute the effective radiated power (Pbseff) of the base station in dBm based on equation (2) as follows:

$$\text{Pbseff}=\text{Pbs}+\text{gain ratio of transmit/receive antennas}+\text{BS Tx Feeder Gain}-\text{BS Rx Feeder Gain}, \quad (2)$$

In equation (2), parameters that impact uplink system gain (Kul) are represented as negative values and parameters that impact downlink system gain (Kdl) are represented as positive parameters. To the extent there is a loss, parameters that impact uplink system gain (Kul) would be represented as positive values in equation (2) and parameters that impact downlink system gain (Kdl) would be represented as negative parameters in equation (2).

In one implementation, the effective radiated power (Pbseff) of the base station can be quantized in eight (8) bits to send values for the effective radiated power (Pbseff) that can range from −128 dBm to +127 dBm.

In some implementations, the effective radiated power (Pbseff) can be communicated by the base station in a beacon, for example, when the downlink channel is Idle (e.g., upon power up, during channel hang time).

Estimating RSSbs, Received Signal Strength at Base Station Antenna Port

Equation (2) can be re-written as Equation (3) as follows:

$$\text{Pbseff}=\text{Pbs}+\text{Kdl}-\text{Kul}, \quad (3)$$

which allows Equation (1) to be written as Equation (4) as follows:

$$\text{RSSbs}=\text{RSSwcd}+\text{Pwcd}-\text{Pbseff} \quad (4)$$

Other Parameters Communicated by the Base Station

The base station may also communicate other parameters or thresholds that will be used by the wireless communication device. In some implementations, these other parameters can also be communicated in the same beacon used to communicate the effective radiated power (Pbseff). Some of the other parameters will be referred to as RSSthresh_Opt, RSSthresh_Min, and RSSautoroam.

As used herein, the value "RSSthresh_Opt" refers to an optimum uplink RSS threshold value required at the base station's receiver antenna port in dBm. The value of the optimum uplink RSS threshold value (RSSthresh_Opt) at the can be calculated by equation (5) as:

$$\text{RSSthresh\_Opt}=\text{SNR\_Opt}+\text{Nbs} \quad (5),$$

where 'SNR_Opt' is desired optimum signal-to-noise ration (SNR) at the base station, and where the parameter "Nbs" refers to the base station receiver's noise limit, which is calculated as $kBT_{effective}$, where k is Boltzmann constant where B is receiver Bandwidth, and where $T_{effective}$ is effective noise Temperature, which includes noise contributors into the receiver; the noise radiated into the antenna and the thermal noise generated in the receiver.

As used herein, the value "RSSthresh_Min" refers to a minimum uplink RSS threshold value (in dBm) required at the base station's receiver antenna port. The minimum uplink RSS (RSSthresh_Min) required at the base station can be calculated via equation (6) as:

$$\text{RSSthresh\_Min}=\text{SNRMin}+\text{Nbs}, \quad (6)$$

where SNR_Min is the minimum Signal to Noise Ratio required to support voice and/or data services. The SNR_Min can be the required Signal to Noise Ratio to achieve a given Bit Error Rate (BER) in the receiver.

As used herein, the value "RSSauto-roam" refers to a minimum uplink RSS automatic roaming threshold value (in dBm) that is transmitted by a base station. The minimum uplink RSS automatic roaming threshold value (RSSautoroam) is the RSS value required by the wireless communication device to stay associated with its current base station. As will be described below, wireless communication device starts autoroaming procedure when the estimated uplink received signal strength (RSSbs) at the base station falls below this threshold. The relationship between various uplink RSS thresholds is expressed in expression (7) as follows:

$$\text{RSSthresh\_Min} \leq \text{RSSautoroam} \leq \text{RSSthresh\_Opt} \quad (7).$$

As will now be described below, the effective radiated transmit power (Pbseff) and other parameters (e.g., RSSthresh_Opt, RSSthresh_Min, and RSSautoroam) for a particular base station can be communicated to one or more wireless communication devices, and then used by the wireless communication device in a variety of different ways.

Figure 5:
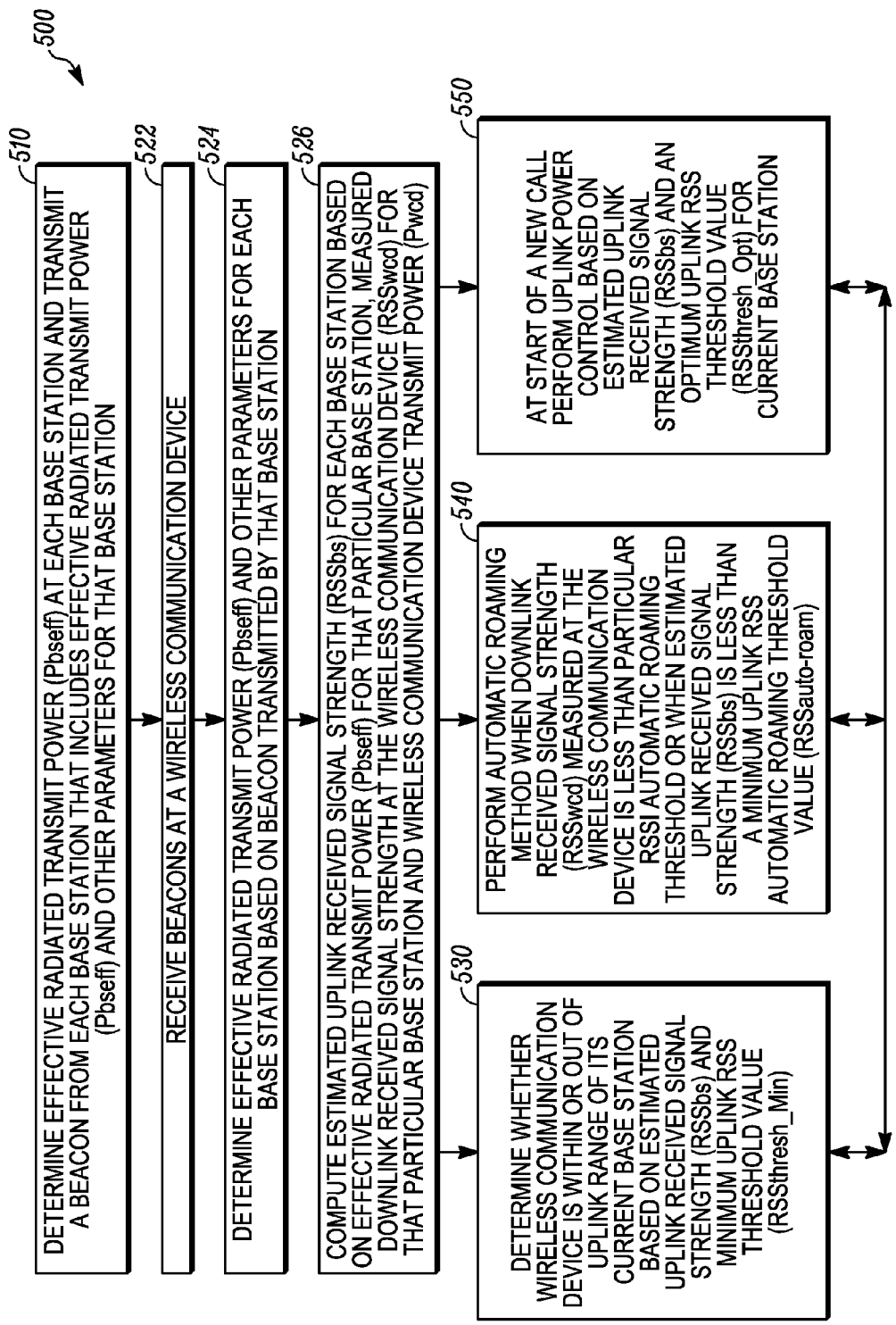
FIG. 5 is a flowchart illustrating a method for using effective radiated transmit power at a wireless communication device in accordance with some embodiments.

FIG. 5 is a flowchart illustrating a method 500 for using effective radiated transmit power at a wireless communication device in accordance with some embodiments.

The method 500 begins at step 510 where each base station determines its effective radiated transmit power (Pbseff) and then transmits a beacon that includes the effective radiated transmit power (Pbseff) and other parameters (e.g., RSSthresh_Opt, RSSthresh_Min, and RSSauto-roam) for that base station over the air.

At 522, a wireless communication device receives at least one of the beacons transmitted by at least one of the base stations. At 524, the wireless communication devices determines (e.g., measures or calculates) a downlink received signal strength (RSSwcd) value for that particular base station, and other parameters for that particular base station, for example, based on the beacon received from that particular base station.

At 526, the wireless communication device also computes an estimated uplink received signal strength (RSSbs) for each base station from which it received a beacon with effective radiated transmit power (Pbseff) information. More specifically, for each base station, the wireless communication device can use the effective radiated power (Pbseff) for that particular base station, the value of RSSwcd measured by the wireless communication device for that particular base station, and the actual transmit power (Pwcd) of the wireless communication device to determine/compute (e.g., via equation (4) above) the value of estimated uplink received signal strength (RSSbs) for that particular base station.

Once this information has been determined by the wireless communication device, the wireless communication device can use this information for a variety of purposes.

For example, in some embodiments illustrated at 530, the wireless communication device can determine whether the wireless communication device is within or outside of uplink transmission range of its current base station based on the estimated uplink received signal strength (RSSbs) value computed for its current base station, and a minimum uplink RSS threshold value (RSSthresh_Min) required at its current base station's receiver antenna port. One specific implementation of 530 will be described below with reference to FIG. 6.

In other embodiments, the wireless communication device can perform an automatic roaming method when it determines that certain conditions are met. For example, when the wireless communication device determines that a downlink RSSwcd value for a particular base station is less than a minimum preprogrammed downlink RSS automatic roaming threshold value (RSSauto-roam) the wireless communication device can then initiate the automatic roaming method. Alternatively, when the wireless communication device determines that the estimated uplink received signal strength (RSSbs) value is less than a minimum uplink RSS automatic roaming threshold value (RSSauto-roam) that is required by the wireless communication device to stay with its current base station, the wireless communication device can also initiate the automatic roaming method. After deciding to begin the automatic roaming method, the wireless communication device will continue to utilize RSSbs values computed by the wireless communication device at 520 as part of the automatic roaming method. One specific implementation of the automatic roaming method will be described below with reference to FIG. 7.

In other embodiments, at 550, the wireless communication device can use information determined and computed at 520 (e.g., the estimated uplink received signal strength (RSSbs) value and an optimum uplink RSS threshold value (RSSthresh_Opt)) to perform uplink power control each time the wireless communication device starts a new call. As used herein, the term "call" is defined broadly and refers to any exchange of information between members of a communication group including voice, data, and control signaling. One specific implementation of 550 will be described below with reference to FIG. 8.

In addition, in other embodiments, any of the embodiments described at 530, 540 and/or 550 (or implementations thereof that will be described with reference to FIGS. 6-8) can be combined in any order. Various combinations of these embodiments can run/execute concurrently (in parallel), in series before each other and/or in series after each other. One such example will be described below with respect to FIGS. 9A-9C.

For instance, when the wireless communication device determines that it is out of uplink transmission range at 530, the wireless communication device can begin to perform an automatic roaming method at 540 and/or perform uplink power control at 550.

Alternatively, in other embodiments, after the wireless communication device performs an automatic roaming method at 540 and selects a new base station to roam to and associate with, anytime the wireless communication device decides to start a new call, the wireless communication device can perform uplink power control as described at 550.

In addition, in still other embodiments, when the wireless communication device performs automatic roaming at 540, the wireless communication device can also determine whether it is within or out of uplink transmission range of a particular base station using techniques similar to those described with respect to 530.

In addition in still other embodiments, after or while the wireless communication device performs uplink power control at 550, the wireless communication device may also continue to determine whether it is within uplink transmission range of its current base station using 530.

In short, any of the embodiments described herein can be combined and used/or in conjunction with each other.

Particular implementations of each of the methods at 530, 540 and 550, will now be described below with respect to FIG. 6, FIG. 7, and FIG. 8, respectively.

Determination of Whether a Wireless Communication Device is within Uplink Transmission Range of a Base Station In accordance with some of the disclosed embodiments, the wireless communication device can use the effective radiated power (Pbseff) of the base station to compute an estimated uplink received signal strength (RSSbs) value, and then use the estimated uplink received signal strength (RSSbs) value to determine whether the wireless communication device is out of its uplink transmission range to a particular base station. In this manner, the wireless communication device can determine whether it is likely that the wireless communication device will be unable to successfully transmit to the base station on its uplink even though the wireless communication device is measuring a sufficient downlink RSS.

Figure 6:
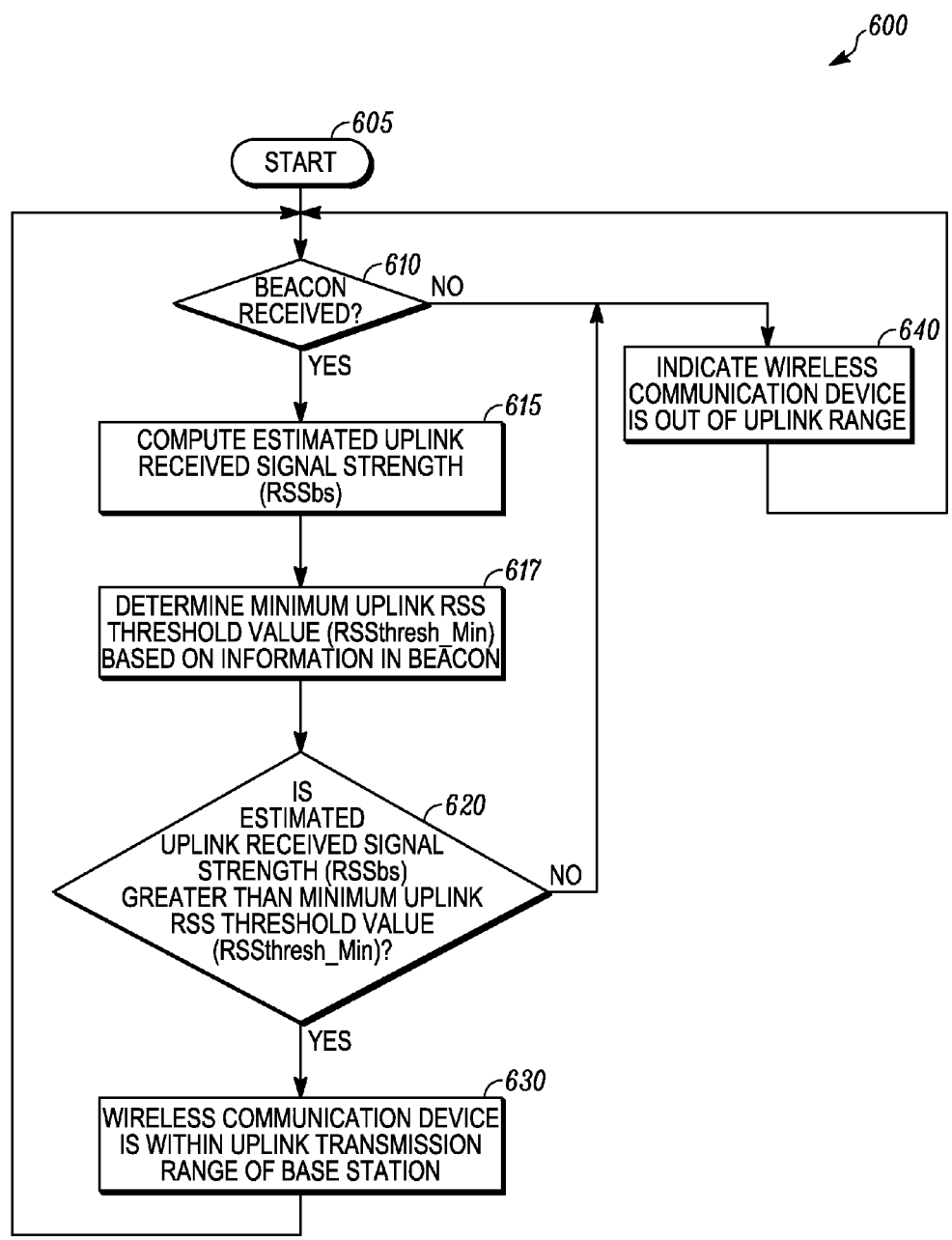
FIG. 6 is a flowchart illustrating a method for determining whether a wireless communication device is within or outside of uplink transmission range of a base station in accordance with some embodiments.

FIG. 6 is a flowchart illustrating a method 600 for determining whether a wireless communication device is within or outside of uplink transmission range of a base station in accordance with some embodiments. Method 600 can be used to determine when an asymmetric transmission scenario is present between the wireless communication device and a base station. In the following description, the method 600 is described as being applied to a base station that the wireless communication device is currently associated with. However, this description is not limiting, and method 600 can apply generally to any base station that the wireless communication device receives a beacon from that includes information regarding an effective radiated transmit power (Pbs) of the base station and a minimum uplink RSSI threshold (R_RSSIthresh_Min) required at the base station.

The method 600 starts at wireless communication device power on 605, and at 610 the wireless communication device determines whether a beacon is received from a base station, and when so, the method 600 proceeds to 615. As noted above, each base station can regularly transmit a beacon at a preprogrammed periodic rate that includes effective radiated power (Pbseff) of the base station and other parameters (e.g., RSSthresh_Opt, RSSthresh_Min, and RSSauto-roam) that will be used by the wireless communication device. In one implementation, multi-site systems that support site roaming can transmit beacons as often as every few seconds, but for single site systems the beacons can be transmitted at about every tens of seconds. When the wireless communication devices are within downlink transmission range, the wireless communication device will receive the beacon. In this regard, it is noted that the wireless communication device may receive beacons from multiple different base stations. At 615, the wireless communication device uses the effective radiated power (Pbseff) information received in the beacon to compute the estimated uplink received signal strength (RSSbs) value at the base station using equation (4), and at 617 determines (e.g., reads) the value of RSSthresh_Min that was transmitted by the base station, for example, in the beacon. As explained above, in one implementation, the wireless communication device can then use the effective radiated power (Pbseff) of the base station, the value of RSS measured by the wireless communication device (RSSwcd), and the actual transmit power (Pwcd) of the wireless communication device to determine/compute the value of estimated uplink received signal strength (RSSbs) at the base station via equation (4). As also explained above, the estimated uplink received signal strength (RSSbs) is the received signal strength that the base station would measure for signals received from the wireless communication device.

The method 600 then proceeds to 620, where the wireless communication device determines whether the estimated uplink received signal strength (RSSbs) is greater than a minimum uplink RSS (RSSthresh_Min) required at the base station's receiver antenna port. In some implementations, the minimum uplink RSS (RSSthresh_Min) required at the base station's receiver antenna port can be transmitted OTA in a beacon by the base station.

When the wireless communication device determines that the estimated uplink received signal strength (RSSbs) measured at the base station is greater than the minimum uplink RSS (RSSthresh_Min), the method proceeds to 630, where the wireless communication device determines that it is within uplink transmission range of the base station. The wireless communication device can then transmit (or continue to transmit) to the base station. In other words, the wireless communication device determines that its transmission will have sufficient power on the uplink channel to be received by the base station when the wireless communication device determines that it is receiving a beacon from the base station (yes at 610), and the estimated uplink received signal strength (RSSbs) is greater than the minimum uplink RSS (RSSthresh_Min) (yes at 620).

When the wireless communication device determines that a beacon is not received from the base station (at 610) or that the estimated uplink received signal strength (RSSbs) is not greater than the minimum uplink RSS (RSSthresh_Min) (at 620), the method 600 then proceeds to 640, where the wireless communication device determines that it is outside of uplink transmission range to the base station. Thus, the wireless communication device can determine that it is out of range when either of the conditions at 610, 620 are not met.

In some embodiments, (not shown) when a wireless communication device determines that it is out of uplink transmission range, the wireless communication device can adjust its on/off duty cycle or power down to save battery resources until a beacon is received (yes at 610) and the estimated uplink received signal strength (RSSbs) is greater than the minimum uplink RSS (RSSthresh_Min) (yes at 620). In some implementations, the decision points (410 and 620) may use some type of hysteresis to keep from fluctuating quickly between states.

In some implementations of 640, the wireless communication device can provide a visual or audible indication at the wireless communication device that the wireless communication device is outside of uplink transmission range to the base station so that the user/operator is alerted of poor uplink conditions, knows that it is likely outside of uplink transmission range, and knows that attempts to transmit to the base station will likely be unsuccessful. This can include an estimated uplink received signal strength (RSSbs) for the operator. This helps during asymmetric transmission (AST) scenarios by providing an out of range indication that enhances the user experience. For example, a display on the wireless communication device can display the estimated uplink received signal strength (RSSbs) at the base station with an indication of whether or not it is adequate. These indications can prevent the user/operator from initiating a call when it is unlikely to be received by the base station, which can reduce the likelihood of a "dead key" situation. In addition, in some implementations, the wireless communication device can send a message to the rest of the devices and base stations etc indicating it is out of range of the particular base station so the other devices are notified Automatic Roaming Method When the wireless communication device initially powers up, effective radiated power (Pbseff) information is not yet available for any base station, and therefore the wireless communication device will scan for all base stations, measure an RSSwcd value for each base station that is within range, and simply select the base station that has the highest measured downlink RSSwcd value as the base station to associate with. It would be desirable for the wireless communication device to determine when to automatically roam to and associate with another base station when it determines, for example, that it is out of transmission range of the base station that it is currently associated with so that the wireless communication device can be within uplink transmission range of a base station.

In accordance with some embodiments, after the wireless communication device associates with the initially selected base station (e.g., the base station with highest downlink RSSwcd), the wireless communication device can obtain the effective radiated power (Pbseff) and other parameters (e.g., RSSthresh_Opt, RSSthresh_Min, and RSSauto-roam) from each base station. The effective radiated power (Pbseff) of the base station allows the wireless communication device to determine key variables including the estimated uplink received signal strength (RSSbs). When the wireless communication device determines, based on the effective radiated power (Pbseff) of the base station, that it is approaching the edge of its transmit range on its uplink (RSSbs<RSSautoroam), an enhanced autoroaming method can be triggered that is used by the wireless communication device to select a better base station that is capable of receiving its transmission at the base station. As will be described below, the effective radiated power (Pbseff), the estimated uplink received signal strength (RSSbs) and the received signal strength roaming threshold for each base station can then be used by the wireless communication device when performing an automatic roaming method 700 for determining which base station the wireless communication device should associate with. Stated differently, the wireless communication device can also use the estimated uplink received signal strength (RSSbs) and the received signal strength roaming threshold (RSSauto-roam) to make roaming decisions when performing the enhanced automatic roaming method for determining whether the wireless communication device should associate with a new base station. These embodiments can provide a mechanism to perform efficient roaming regardless of the transmit power of the base station and regardless of transmit power of the portable/mobile wireless communication device.

Table 1. It is noted that the numbers used in Table 1 are not limiting and are provided merely to illustrate one implementation.

In one implementation, each base station can be identified by an operating frequency and color code pair that is unique for that base station (at least within a single wide area system). The base station frequencies and color codes can be programmed in the wireless communication device, and the wireless communication device can populate Table 1 as it obtains effective radiated power (Pbseff) and the received signal strength roaming threshold (RSSauto-roam) information for each base station. When the wireless communication device powers up, it will not have any entries in Table 1, and all entries in the status column will include an not applicable (NA) entry, and all entries in the effective radiated power (Pbseff), the estimated uplink received signal strength, the received signal strength roaming threshold and the normalized signal strength for each base station will be empty. When the wireless communication device searches for a new base station to associate with, it scans the frequencies in column 1 for a beacon signal. As the effective radiated power (Pbseff) and the received signal strength roaming threshold (RSSauto-roam) for each base station is received, the wireless communication device changes the status in column 3 to "available," and stores a value for effective radiated power (Pbseff) and or and the received signal strength roaming threshold (RSSauto-roam) each base station in column 4 of the Table 1.

TABLE 1

| Frequency | Color Code | Status (Available (A)/ Not available (NA)) | Effective radiated power (Peff) of the base station (in dBm) | Estimated uplink received signal strength (RSSbs) of the base station (in dBm) | Received signal strength roaming threshold (RSSauto-roam) of base station (in dBm) | Normalized signal strength (NSS) of base station (in dB) |
|---|---|---|---|---|---|---|
| 430 MHz | 01 | NA | | | | |
| 440 MHz | 02 | A | 45 | −115 | −105 | −10 |
| . | . | . | . | . | . | . |
| . | . | . | . | . | . | . |
| . | . | . | . | . | . | . |
| X MHz | 15 | A | 40 | −95 | −105 | 10 |

Figure 7:
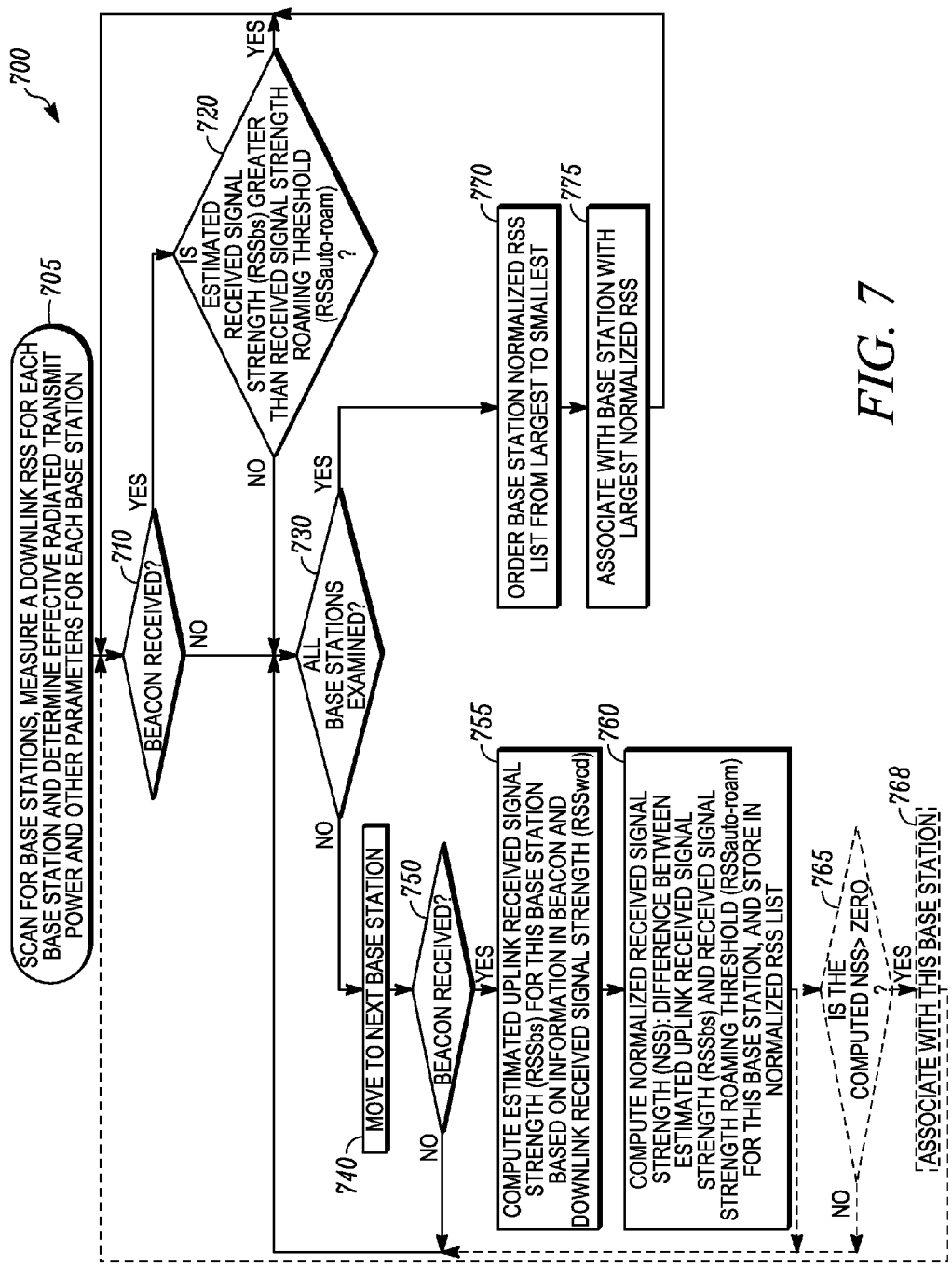
FIG. 7 is a flowchart illustrating an automatic roaming method implemented at a wireless communication device in accordance with some embodiments.

FIG. 7 is a flowchart illustrating an automatic roaming method 700 implemented at a wireless communication device in accordance with some embodiments. Preliminarily it is noted that boxes 765, 768, 770 and 775 are illustrated in dashed lines since they are optional steps, acts or tasks that can be performed in some embodiments but not others. For example, in some implementations, boxes 765, 768, 770 and 775 can all be performed. In other implementations, boxes 765, 768 are performed, but boxes 770 and 775 are not. In still other implementations, boxes 770, 775 are performed, and boxes 765, 768 are not Autoroaming Database Prior to describing the automatic roaming method 700, an automatic roaming database will now be described. The wireless communication devices can generate and maintain a database that tracks an estimated uplink received signal strength (RSSbs) and a normalized signal strength (NSS) value for each base station. As will be explained in greater detail below, a NSS value is the difference between the estimated uplink received signal strength (RSSbs) and the received signal strength roaming threshold (RSSauto-roam). One implementation of such a database is illustrated below in The wireless communication device can use the effective radiated power (Pbseff) information to compute (using equation (4)) the estimated uplink received signal strength (RSSbs) that would be measured at the particular base station. The wireless communication device can then use the estimated uplink received signal strength (RSSbs) and the received signal strength roaming threshold (RSSauto-roam) to calculate the normalized received signal strength (Normalized RSS) of each base station as expressed in equation 8 as follows $$\text{Normalized RSS} = \text{RSSbs} - \text{RSSauto-roam} \qquad (8).$$

The normalized received signal strength (Normalized RSS) determines the amount of margin that the estimated uplink signal strength (RSSbs) has over the received signal strength roaming threshold (RSSauto-roam). In other words, the larger the value of normalized received signal strength (Normalized RSS), the better the uplink signal is for that particular base station.

In some implementations, the wireless communication device determines whether to start the automatic roaming method 700 when the wireless communication device determines that either an estimated uplink received signal strength (RSSbs) as determined by the wireless communication device is less than the received signal strength roaming threshold (RSSauto-roam) required by the wireless communication device to stay at its current base station, or the wireless communication device does not receive beacons from the associated base station.

Further, in some implementations, the base stations searched for via method 700 can be all base station in the network or all base stations specified in a search list that is stored at the wireless communication device. The method 700 starts at 705 of FIG. 7, where, the wireless communication device can start to perform a scan for all base stations within the network or all base stations specified in its search list, measure a downlink RSSwcd value for each base station that is detected, determine the effective radiated power (Pbseff) information for each base station that is detected, and update other parameters (e.g., RSSthresh_Opt, RSSthresh_Min, and RSSauto-roam) for each base station that is detected. As will be explained below, the wireless communication device can eventually also use the effective radiated power (Pbseff) information for each base station to determine a normalized received signal strength (Normalized RSS) for each of the base stations.

The method 700 then proceeds to 710, where the wireless communication device determines whether a beacon is received from a base station. When the wireless communication device determines (at 710) that a beacon is received from a base station, the method 700 proceeds to 720. By contrast, when the wireless communication device determines (at 710) that a beacon is not received from a base station, the method 700 proceeds to 730.

At 720, the wireless communication device uses the effective radiated power (Pbseff) information received in the beacon to compute the estimated uplink received signal strength (RSSbs) value at the base station using equation (1), and also determines a minimum uplink RSS automatic roaming threshold value (RSSauto-roam) that was transmitted by the base station, for example, in the beacon. The estimated uplink received signal strength (RSSbs) is the received signal strength that the base station would measure for signals received from the wireless communication device, and the minimum uplink RSS automatic roaming threshold value (RSSauto-roam) (in dBm) is required by the wireless communication device to stay with its current base station. At 720, the wireless communication device also determines whether the estimated uplink received signal strength (RSSbs) at it's current base station is greater than or equal to the minimum uplink RSS automatic roaming threshold value (RSSauto-roam) (in dBm).

When the wireless communication device determines (at 720) that the estimated uplink received signal strength (RSSbs) at it's current base station is greater than or equal to the minimum uplink RSS automatic roaming threshold value (RSSauto-roam), the method 700 then loops back to 710 to continue monitoring for beacons on its associated base station. When the wireless communication device determines (at 720) that the estimated uplink received signal strength (RSSbs) at it's current base station is less than the minimum uplink RSS automatic roaming threshold value (RSSauto-roam), the method 700 proceeds to 730.

Automatic roaming is not initiated at 710 or 720 when estimated uplink received signal strength (RSSbs) is greater than minimum uplink RSS automatic roaming threshold value (RSSauto-roam). Here the wireless communication device stays associated with its current base station and continues to monitor for beacons as it moves about it's coverage area. Alternatively, when the wireless communication device determines that a beacon is not received from the base station (at 710) or that the estimated uplink received signal strength (RSSbs) is less than the RSSauto-roam (at 720), this essentially means that the wireless communication device determines that it is nearing or already outside of uplink transmission range to the base station, and therefore the method 700 then proceeds to 730. Thus, the wireless communication device can determine that it is nearing out of uplink range (no at 720) or out of range (no at 710), and therefore that automatic roaming should be initiated. In some implementations, (not shown) prior to step 730, the wireless communication device can provide a visual or audible indication at the wireless communication device that the wireless communication device is outside of uplink transmission range to the base station.

At 730, the wireless communication device determines whether all base stations have been scanned for. The base stations scanned for can be all base station in the network or all base stations specified in a search list that is stored at the wireless communication device.

When the wireless communication device determines that all base stations have not been scanned for, the method 700 then proceeds to 740, where the wireless communication device selects the next base station, performs a scan to detect the next base station's beacon. At 750, the wireless communication device determines whether a beacon was received from the next base station.

When a beacon was not received from the next base station (no at 740), the method 700 loops back to 730.

When a beacon was received from the next base station (yes at 740), the wireless communication device will measure a downlink RSS value for each base station that is detected, and use information transmitted in the beacon to update the effective radiated power (Pbseff) information and other parameters (e.g., RSSthresh_Opt, RSSthresh_Min, and RSSauto-roam) for each base station that is detected. The method 700 proceeds to 755, where the wireless communication device computes an estimated uplink received signal strength (RSSbs) for the next base station based on the effective radiated power (Pbseff) information from the beacon that was received from the next base station, the downlink received signal strength (RSSwcd) measured by the wireless communication device, and the actual transmit power of the wireless communication device (Pwcd).

The method 700 then proceeds to 760, where the wireless communication device computes a normalized RSS value for that base station. The normalized RSS value for a base station is equal to the difference between the estimated uplink received signal strength (RSSbs) (in dBm) for that particular base station and the minimum downlink RSS automatic roaming threshold value (RSSauto-roam) (in dBm) required by the wireless communication device to stay associated with it's current base station. Alternatively, when the estimated uplink received signal strength (RSSbs) for that particular base station and the minimum downlink RSS automatic roaming threshold value (RSSauto-roam) are first converted to a log representation, the ratio of the downlink received signal strength (RSS) measured by the wireless communication device for the particular base station to the effective radiated power for that particular base station (Pbseff) is the same as or equivalent to subtraction of those values. The wireless communication device then stores the normalized RRS value in a normalized RSS list. For each base station that the wireless communication device receives a beacon from at 750, the Normalized RSS list includes an identifier for that particular base station and a corresponding Normalized RSS value. In some embodiments in which all base stations are scanned for, the method 700 loops back to 730 following 760, where the wireless communication device again determines whether all base stations have been scanned for.

However, in other embodiments, the wireless communication device may select the first base station that satisfies certain criteria. Boxes 765 and 768 are illustrated in dashed lines since they are optional and performed in some embodiments and not others. For example, in some non-limiting embodiments, each time a normalized received signal strength (RSS) value is computed (at 760) for a particular base station, the wireless communication device can determine, at 765, whether that computed normalized received signal strength (RSS) value is greater than zero. When the wireless communication device determines, at 765, that the computed normalized received signal strength (RSS) value is not greater than zero, the method 700 loops back to 730 so that the next base station can be scanned for. At 768, the wireless communication device can associate with the first base station that is determined to have a computed normalized received signal strength (RSS) value that is greater than zero. Following 768, the method 700 can loop back to 710.

When the wireless communication device determines (at 730) that all base stations have been scanned for, the method 700 then proceeds to 770, where the wireless communication device can then arrange or order the base stations in the descending order of their normalized RSS value (from largest normalized RSS value to smallest normalized RSS value) in a normalized RSS sort list. The method 700 then proceeds to 775, where the wireless communication device selects the one base station specified in the Normalized RSS sort list that has the highest Normalized RSS value, as the new base station it will roam to and associate with. Again, boxes 770 and 775 are illustrated in dashed lines since they are optional steps, acts or tasks that can be performed in some embodiments but not others. In some implementations, boxes 770 and 775 can be performed and in other implementations, boxes 770 and 775 are not. The method 700 can then loop back to 710, where it continues to monitor its current base station for beacons.

Power Control, Battery Saving and Interference Reduction Methods

RF transmission consumes much of the battery power in a portable wireless communication device. Additionally, higher than required transmit power from the wireless communications device can also result in interference issues on other uplink channels of different co-located base station receivers and thus reduce the uplink range on other channels. To conserve battery power and reduce interference issues, it would be desirable to provide a mechanism for the wireless communication device to adjust its transmit power depending on its uplink RF distance from the base station.

To perform transmit power control to save the battery power and reduce potential interference issues, the wireless communication device computes how much transmit power (Pwcd) is needed for it's transmissions to reach the base station. In accordance with other embodiments, the effective radiated power (Pbseff) received from the base station can be used by the wireless communication device to compute an appropriate value for the actual transmit power (Pwcd) of the wireless communication device to help ensure that the estimated uplink received signal strength (RSSbs) at it's current base station is greater than the optimum uplink RSS threshold value (RSSthresh_Opt) at it's current base station. This threshold value (RSSthresh_Opt) is typically a value selected that will produce virtual error free communications, even in harsh faded signal conditions, at the receiver. Therefore, increases in additional transmit power will not result in communication improvements. Having computed an appropriate value for the actual transmit power (Pwcd) of the wireless communication device, the wireless communication device can then set it's actual transmit power (Pwcd) to a proper value to help conserve or save battery power of the wireless communication device and increase in the battery life of the wireless communication device as well as reduce potential interference issues. In this manner, when the wireless communication device is far away from the base station, it can transmit at higher transmit power to increase it's uplink transmission range, and thus increase the likelihood that it's transmissions will reach it's current base station. The wireless communication device can also transmit at a lower power when it determines that it is closer (in terms of RF distance) to it's current base station, so that the wireless communication device can conserve battery resources and reduce potential interference. These embodiments can provide a distributed, base-station-assisted, open loop power control mechanism that helps save battery resource and/or helps increase the battery life of a portable wireless communication device as well as reducing potential interference issues.

Figure 8:
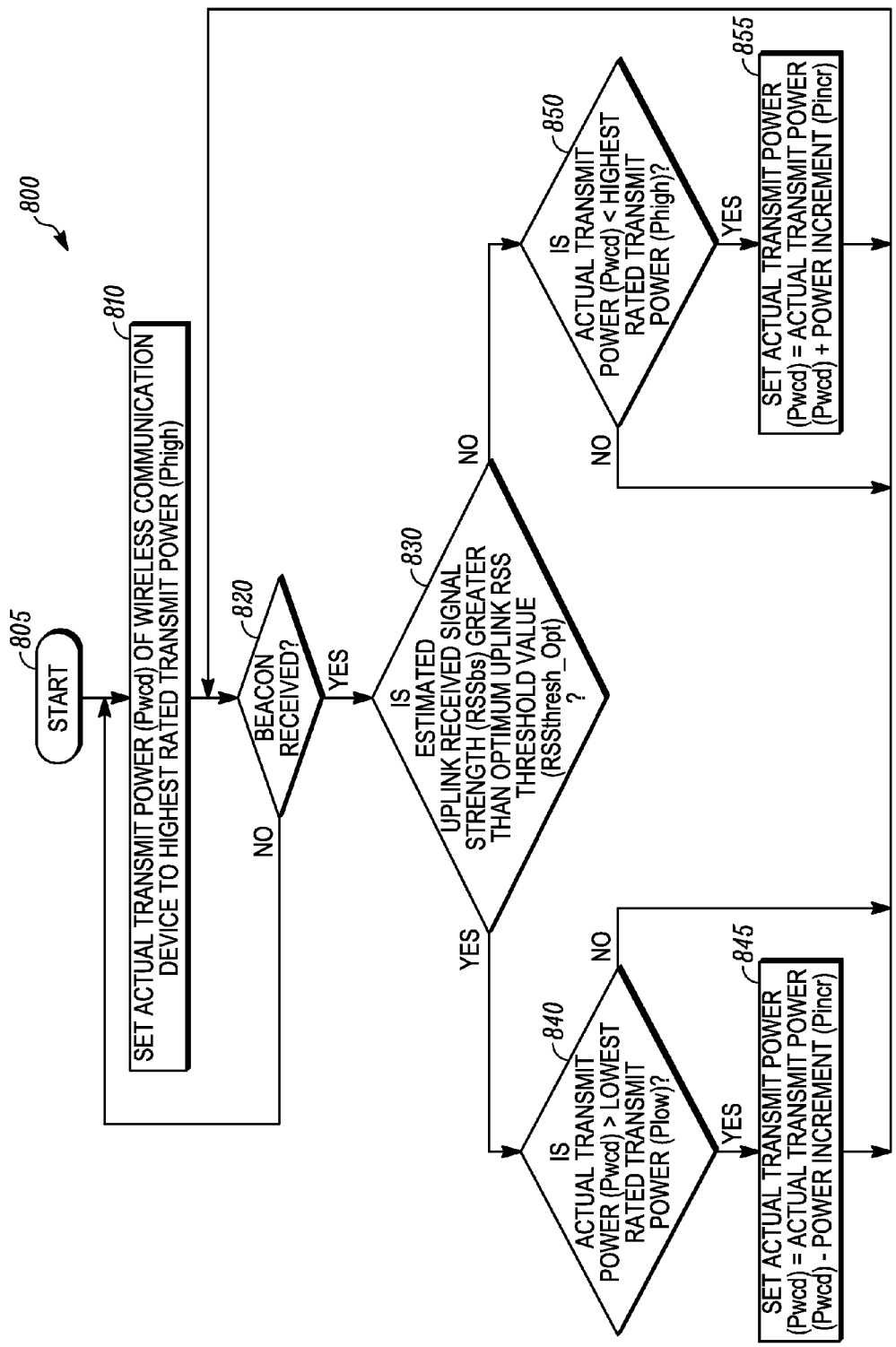
FIG. 8 is a flowchart illustrating a method for adjusting transmit power at a wireless communication device in accordance with some embodiments.

FIG. 8 is a flowchart illustrating a method 800 for adjusting transmit power (Pwcd) implemented at a wireless communication device in accordance with some embodiments.

The method 800 can be used by the wireless communication device to adjust it's transmit power (Pwcd) at the start of every new call, or to dynamically adjust it's transmit power (Pwcd) during a call when the protocol is a TDMA protocol. By storing beacon transmitted values and measuring downlink received signal strength (RSSwcd) values in the transmission offslots of the TDMA protocol, the wireless communication device can calculate the estimated uplink received signal strength (RSSbs) and adjust its transmit power (Pwcd) during a transmission.

The method 800 starts 805 and at 810 the wireless communication device sets its transmit power (Pwcd) to its highest transmit power level (Phigh). The method 800 then proceeds to 820 where the wireless communication device receives a beacon from the base station that includes effective radiated transmit power (Pbseff) and optimum uplink received signal strength threshold (RSSthresh_Opt). At 830, the wireless communication device uses the parameters in the beacon as well as the measured received signal strength (RSSwcd) of the beacon to determine when the estimated uplink received signal strength (RSSbs) is greater than or less than the optimum uplink received signal strength threshold (RSSthresh_Opt). The received signal strength (RSSwcd) can be measured from any downlink signal, and in one non-limiting implementation, the received signal strength (RSSwcd) can be measured from the beacon.

When the estimated uplink received signal strength (RSSbs) is determined to be greater than the optimum uplink received signal strength threshold (RSSthresh_Opt) (at 830) and the transmit power (Pwcd) of the wireless communication device is determined to be greater than the lowest transmit power (Plow) of the wireless communication device (at 840), then the power of the wireless communication device is decreased by the power control increment (Pincr) at 845. When the estimated uplink received signal strength (RSSbs) is determined to be greater than the optimum uplink received signal strength threshold (RSSthresh_Opt) at 830 and the transmit power (Pwcd) of the wireless communication device is determined to be at the lowest transmit power (Plow) of the wireless communication device at 840, then the transmit power (Pwcd) of the wireless communication device is not changed, and the method 800 returns to 820 where the wireless communication device waits to receive another beacon.

When the estimated uplink received signal strength (RSSbs) is determined to be less than the optimum uplink received signal strength threshold (RSSthresh_Opt) at 830 and the transmit power (Pwcd) of the wireless communication device is determined to be less than the largest transmit power (Phigh) of the wireless communication device at 850, then the transmit power (Pwcd) of the wireless communication device is increased by the power control increment (Pincr) at 855. When the estimated uplink received signal strength (RSSbs) is determined to be less than the optimum uplink received signal strength threshold (RSSthresh_Opt) at 830 and the transmit power (Pwcd) of the wireless communication device is determined to be at the highest transmit power (Phigh) of the wireless communication device at 850, then the transmit power (Pwcd) of the wireless communication device is not changed, and the method 800 proceeds to 820 where the wireless communication device waits to receive another beacon.

Figure 9A:
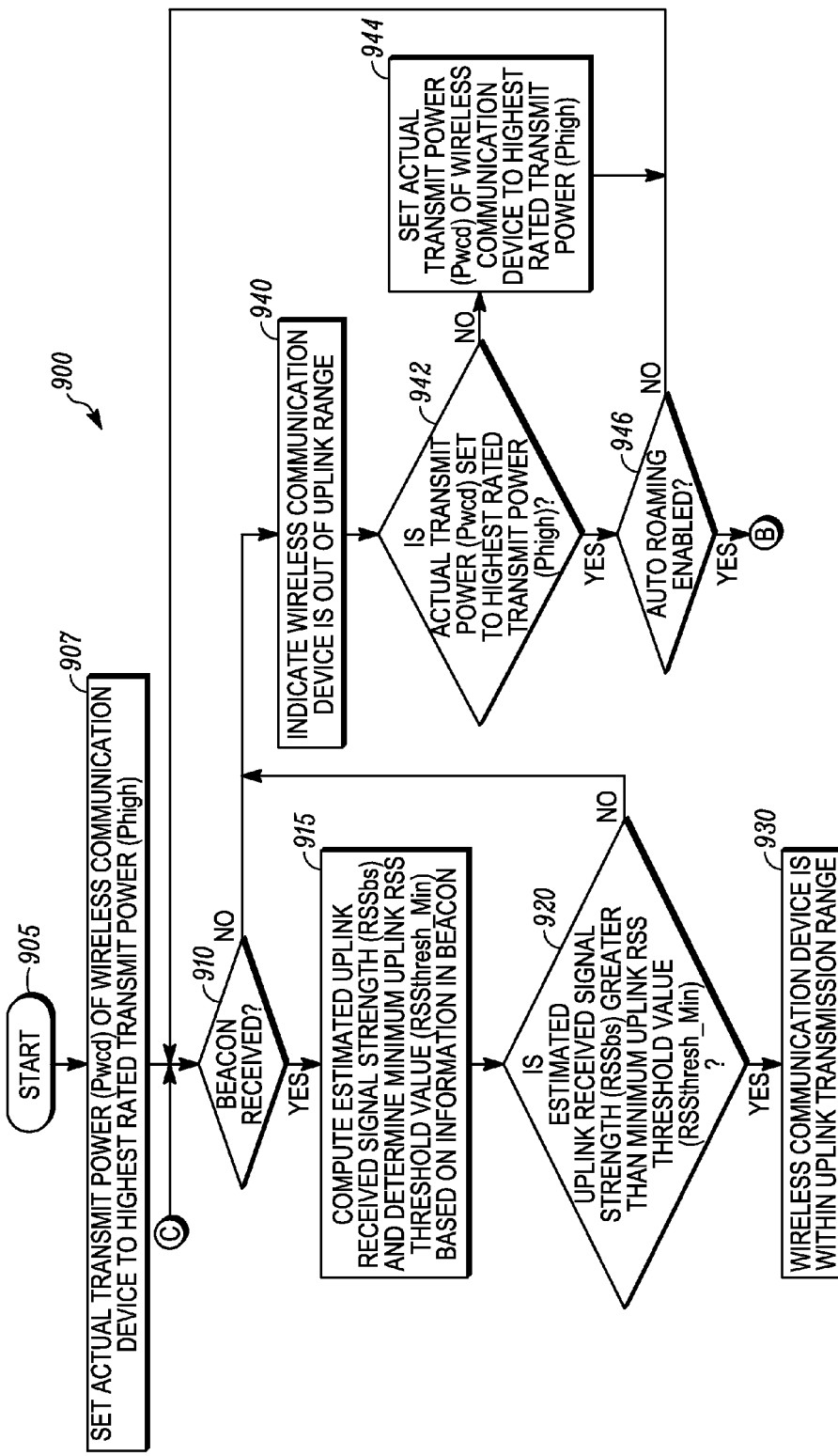
FIGS. 9A-9C are a flowchart illustrating a method in accordance with one implementation of some embodiments.
Figure 9B:
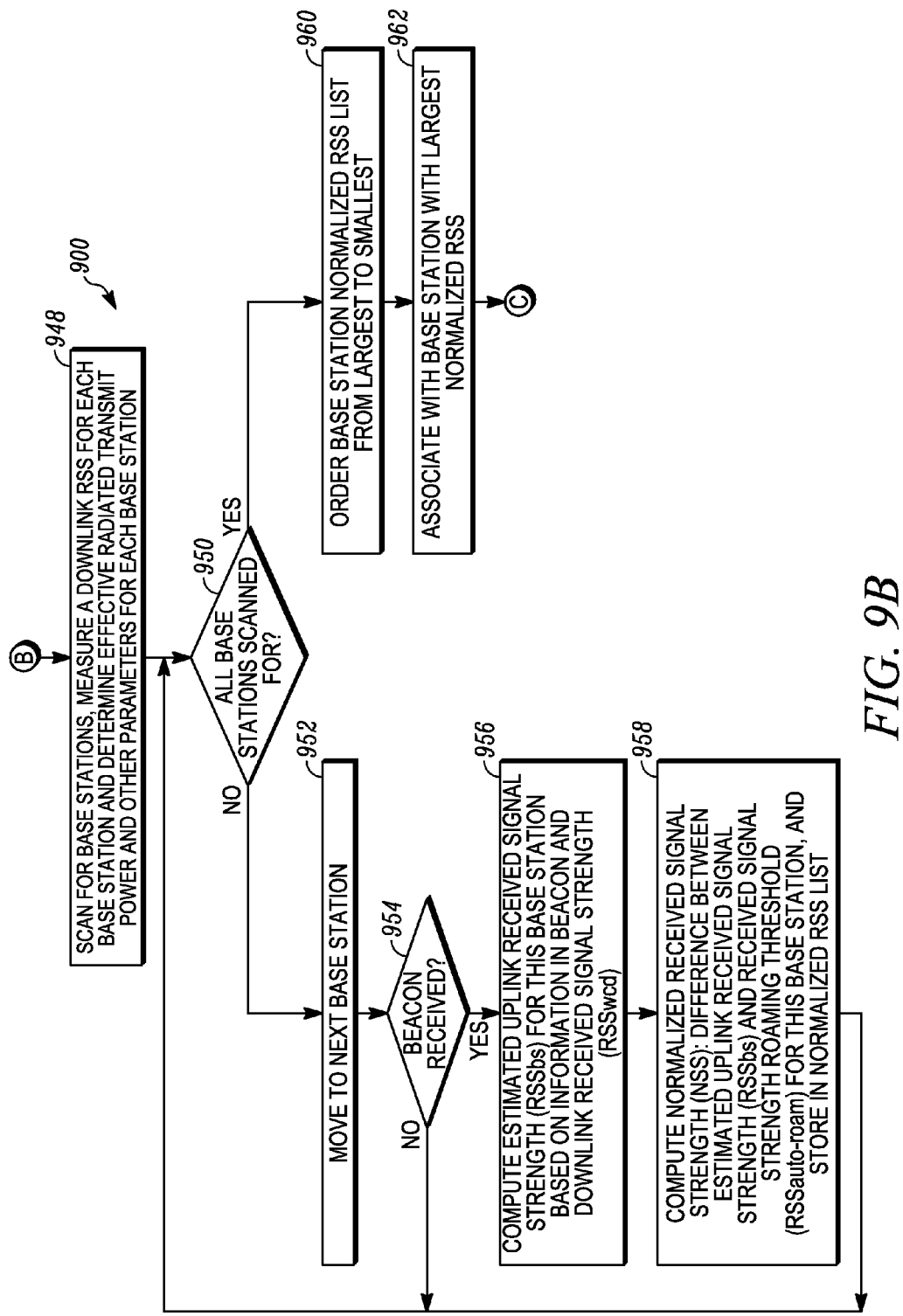
Figure 9C:
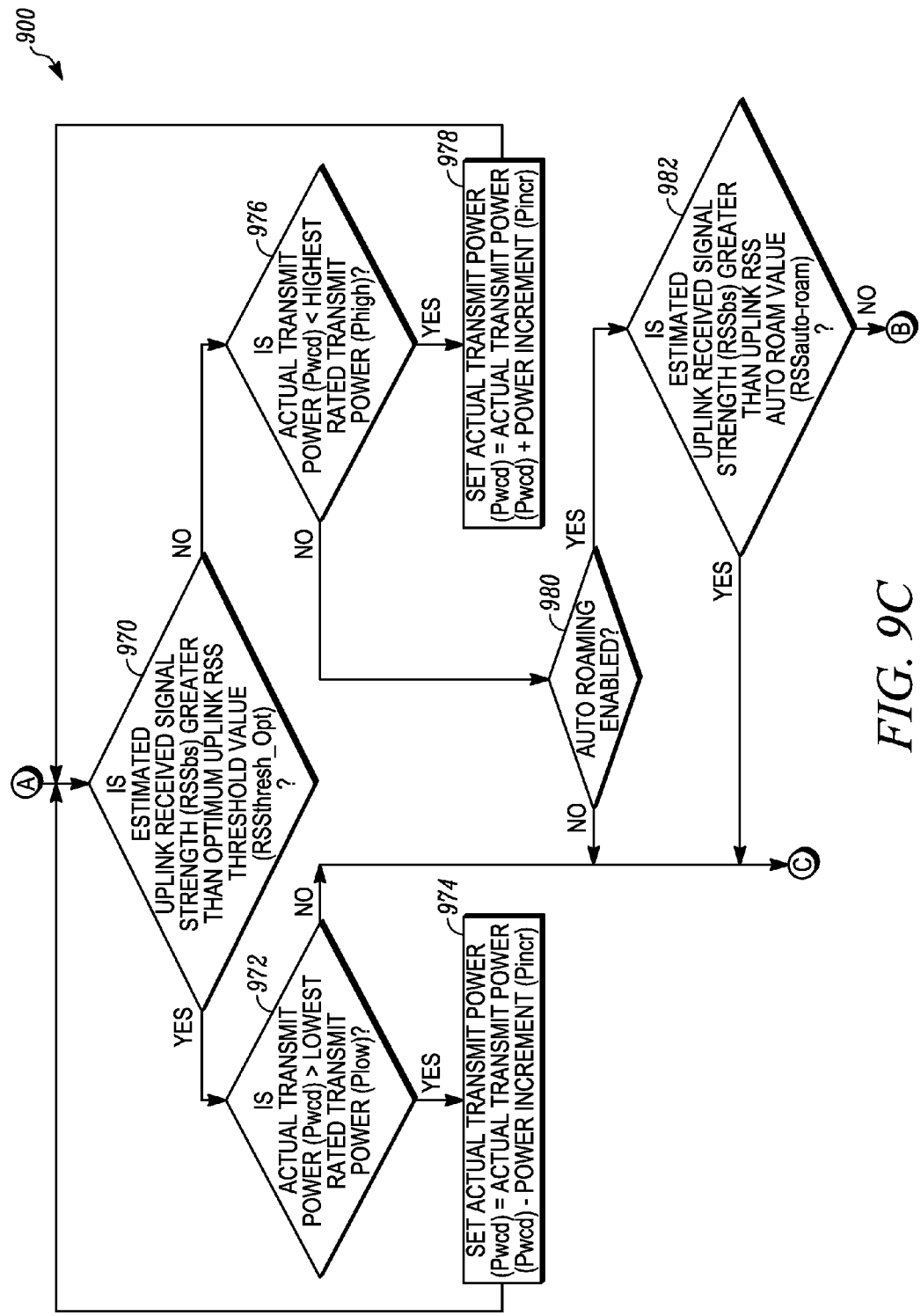

FIGS. 9A-9C are a flowchart illustrating a method 900 in accordance with some embodiments.

The method 900 starts at 905 of FIG. 9A, and at 907 the wireless communication device sets the actual transmit power (Pwcd) of the wireless communication device to the highest rated transmit power (Phigh) value for the wireless communication device.

The method 900 then proceeds to 910, where the wireless communication device determines whether a beacon is received from a base station, and if so, the method 900 proceeds to 915.

At 915, the wireless communication device uses the effective radiated power (Pbseff) information received in the beacon to compute the estimated uplink received signal strength (RSSbs) value at the base station using equation (4), and also determines a minimum uplink RSS threshold value (RSSthresh_Min) required at the base station that was transmitted by the base station, for example, in the beacon. As explained above, in one implementation, the wireless communication device can use the effective radiated power (Pbseff) of the base station, the value of RSS measured by the wireless communication device (RSSwcd), and the actual transmit power (Pwcd) of the wireless communication device to determine/compute the value of estimated uplink received signal strength (RSSbs) at the base station via equation (4). As also explained above, the estimated uplink received signal strength (RSSbs) is the received signal strength that the base station would measure for signals received from the wireless communication device.

The method 900 then proceeds to 920, where the wireless communication device determines whether the estimated uplink received signal strength indicator (RSSbs) is greater than a minimum uplink RSS threshold value (RSSthresh_Min) required at the base station's receiver antenna port.

When the wireless communication device determines that a beacon is not received from the base station (at 910) or that the estimated uplink received signal strength indicator (RSSbs) is not greater than the minimum uplink RSS (RSSthresh_Min) (at 920), the method 900 then proceeds to 940, where the wireless communication device determines that it is outside of uplink transmission range to the base station. Thus, the wireless communication device can determine that it is out of range when either of the conditions at 910, 920 are not met. As above, in some implementations of 940, the wireless communication device can provide a visual or audible indication at the wireless communication device that the wireless communication device is outside of uplink transmission range to the base station.

Following 940, the method 900 proceeds to 942, where the wireless communication device determines whether the actual transmit power (Pwcd) of the wireless communication device is set to the highest rated transmit power (Phigh) value for the wireless communication device.

When the wireless communication device determines that the actual transmit power (Pwcd) of the wireless communication device is not set to the highest rated transmit power (Phigh) value for the wireless communication device, the method 900 then proceeds to 944, where the wireless communication device sets the actual transmit power (Pwcd) of the wireless communication device to the highest rated transmit power (Phigh) value for the wireless communication device, at which point the method 900 loops back to 910 where the wireless communication device waits to receive another beacon.

When the wireless communication device determines that the actual transmit power (Pwcd) of the wireless communication device is set to the highest rated transmit power (Phigh) value for the wireless communication device, the method 900 then proceeds to 946, where the wireless communication device can determine whether automatic roaming is enabled.

When the wireless communication device determines that automatic roaming is not enabled, the method 900 loops back to 910 where the wireless communication device waits to receive another beacon.

When the wireless communication device determines that automatic roaming is enabled, the method 900 proceeds to 948 (FIG. 9B), where the wireless communication device begins scanning for all base stations. When the wireless communication device receives a beacon from any of these base stations, the wireless communication device will measure a downlink RSS value for each base station that is detected, and use information transmitted in the beacon to update the effective radiated power (Pbseff) information and other parameters (e.g., RSSthresh_Opt, RSSthresh_Min, and RSSauto-roam) for each base station that is detected. The wireless communication device can also use the effective radiated power (Pbseff) information for each base station to determine a Normalized RSS for each of the base station that it receives a beacon from during scanning.

The method 900 then proceeds to 950, where the wireless communication device determines whether all base stations specified have been scanned for. The base stations can be all base station in the network or all base stations specified in a search list stored at the wireless communication device.

When the wireless communication device determines (at 950) that all base stations have not been scanned for, the method 900 then proceeds to 954, where the wireless communication device selects the next base station, performs a scan to detect the next base station. At 954, the wireless communication device determines whether a beacon was received from the next base station.

When a beacon was not received from the next base station, the method 900 loops back to 950. When a beacon was received from the next base station, the method 900 proceeds to 956, where the wireless communication device computes an estimated uplink received signal strength (RSSbs) for the next base station based on information from the beacon that was received from the next base station.

The method 900 then proceeds to 958, where the wireless communication device computes the difference between the estimated uplink received signal strength (RSSbs) (in dBm) for the next base station and the minimum downlink RSS automatic roaming threshold value (RSSauto-roam) required by the wireless communication device to stay associated with its current base station and stores the difference as a Normalized RRS value in a Normalized RSS list. For each base station that the wireless communication device receives a beacon from at 954, the Normalized RSS list includes an identifier for that particular base station and a Normalized RSS value that is equal to the difference between estimated uplink received signal strength (RSSbs) for that particular base station and the minimum downlink RSS automatic roaming threshold value (RSSauto-roam) (in dBm) required by the wireless communication device to stay associated with it's current base station. Following 958, the method 900 loops back to 950, where the wireless communication device again determines whether all base stations have been scanned for.

When the wireless communication device determines (at 950) that all base stations have been scanned for, the method 900 then proceeds to 960, where the wireless communication device can then arrange or order the base stations in the descending order of their Normalized RSS value (from highest Normalized RSS value to lowest Normalized RSS value) in a Normalized RSS sort list. At 962, the wireless communication device selects the one base station specified in the Normalized RSS sort list that has the highest Normalized RSS value, as the new base station it will roam to and associate with. The method 900 can then loop back to 910 where the wireless communication device waits to receive another beacon.

Referring again to FIG. 9A, when the wireless communication device determines that the estimated uplink received signal strength (RSSbs) measured at the base station is greater than the minimum uplink RSS threshold value (RSSthresh_Min), the method proceeds to 930, where the wireless communication device determines that it is within uplink transmission range of the base station. The method 900 then proceeds to 970 (FIG. 9C).

At 970, the wireless communication device determines whether the estimated uplink received signal strength (RSSbs) at it's current base station is greater than the optimum uplink RSS threshold value (RSSthresh_Opt) at it's current base station.

When the wireless communication device determines (at 970) that the estimated uplink received signal strength (RSSbs) at it's current base station is greater than or equal to the optimum uplink RSS threshold value (RSSthresh_Opt) at it's current base station, the method 900 proceeds to 972, where the wireless communication device determines whether actual transmit power (Pwcd) of the wireless communication device is greater than the lowest rated transmit power (Plow) value for the wireless communication device. When the wireless communication device determines (at 972) that actual transmit power (Pwcd) of the wireless communication device is greater than the lowest rated transmit power (Plow) value for the wireless communication device, the method 900 proceeds to 974, where the wireless communication device decreases its actual transmit power (Pwcd) by an increment (Pincr), and the method 900 then loops back to 970. When the wireless communication device determines (at 972) that actual transmit power (Pwcd) of the wireless communication device is equal to the lowest rated transmit power (Plow) value for the wireless communication device, the method then loops back to 910 where the wireless communication device waits to receive another beacon.

When the wireless communication device determines (at 970) that the estimated uplink received signal strength (RSSbs) at it's current base station is less than the optimum uplink RSS threshold value (RSSthresh_Opt) at it's current base station, the method 900 proceeds to 976, where the wireless communication device determines whether actual transmit power (Pwcd) of the wireless communication device is less than the highest rated transmit power (Phigh) value for the wireless communication device.

When the wireless communication device determines (at 976) that the actual transmit power (Pwcd) of the wireless communication device is less than the highest rated transmit power (Phigh) value for the wireless communication device, the method 900 proceeds to 978, where the wireless communication device increases its actual transmit power (Pwcd) by an increment (Pincr), and the method 900 then loops back to 970. When the wireless communication device determines (at 976) that the actual transmit power (Pwcd) of the wireless communication device is equal to the highest rated transmit power (Phigh) value for the wireless communication device, the method 900 proceeds to 980, where the wireless communication device determines whether automatic roaming is enabled. When the wireless communication device determines (at 980) that automatic roaming is not enabled, the method 900 loops back to 910 (FIG. 9A), where the wireless communication device continues to determine whether a beacon has been received from a base station.

When the wireless communication device determines (at 980) that automatic roaming is enabled, the method 900 proceeds to 982, where the wireless communication device determines whether the estimated uplink received signal strength (RSSbs) at it's current base station is greater than or equal to the minimum uplink RSS automatic roaming threshold value (RSSauto-roam) (in dBm) required by the wireless communication device to stay with its current base station.

When the wireless communication device determines (at 970) that the estimated uplink received signal strength indicator (RSSbs) at it's current base station is greater than or equal to the minimum uplink RSS automatic roaming threshold value (RSSauto-roam), the method 900 then loops back to 910 where the wireless communication device waits to receive another beacon.

When the wireless communication device determines (at 970) that the estimated uplink received signal strength indicator (RSSbs) at it's current base station is less than the minimum uplink RSS automatic roaming threshold value (RSSauto-roam), the method 900 proceeds to 948 (FIG. 9B), where the wireless communication device sets the actual transmit power (Pwcd) of the wireless communication device equal to the highest rated transmit power (Phigh) value for the wireless communication device.

In the foregoing specification, specific embodiments have been described. However, one of ordinary skill in the art appreciates that various modifications and changes can be made without departing from the scope of the invention as set forth in the claims below. For example, although the effective radiated power (Pbseff) can be transmitted via the beacon in some embodiments, in other embodiments the parameters (e.g., base station power, difference in the receive/transmit gain based on receive/transmit antenna heights and lineup elements like amplifiers, attenuators, etc.) used to generate the effective radiated power (Pbseff) can be transmitted to the wireless communication device(s) in one or more separate communications, and the wireless communication device(s) can then use these parameters as needed (e.g., to compute the effective radiated power (Pbseff)). Similarly, although the other parameters (e.g., R_RSSthresh_Opt, R_RSSthresh_Min, and RSSautoroam) can be transmitted via the beacon in some embodiments, in other embodiments these parameters can be transmitted in separate communications in other embodiments. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory computer-readable storage medium having computer readable code stored thereon for programming a computer (e.g., comprising a processor) to perform a method as described and claimed herein. Non-transitory computer-readable media comprise all computer-readable media except for a transitory, propagating signal. Examples of such non-transitory computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An automatic roaming method, comprising:
   scanning, at a wireless communication device, for base stations;
   each time the wireless communication device receives a transmission from any of the base stations:
   measuring, at the wireless communication device, a downlink received signal strength value for each particular base station that a beacon is received from;
   updating, at the wireless communication device, an effective radiated power information and other parameter for that particular base station based on information transmitted in the beacon, wherein the other parameter comprise a minimum uplink received strength for an automatic roaming, RSSauto-roam, threshold value required by the wireless communication device to stay associated with said each particular base station;
   computing, at the wireless communication device, an estimated uplink signal strength for the particular base station based on the effective radiated power information for that particular base station;
   computing, at the wireless communication device, a normalized received signal strength value for the particular base station by determining a difference between the estimated uplink signal strength for the particular base station and a minimum uplink RSSauto-roam threshold value required by the wireless communication device; and
   enabling automatic roaming at the wireless communication device when the estimated uplink signal strength is less than the minimum uplink RSSauto-roam threshold.

2. The method according to claim 1, further comprising:
   determining, at the wireless communication device, each time a normalized received signal strength value is computed for the particular base station, whether the computed normalized received signal strength value is greater than zero; and
   associating, at the wireless communication device, with a first base station that is determined to have the computed normalized received signal strength value that is greater than zero.

3. The method according to claim 2, wherein the scanning for each base station, comprises:
   determining, at the wireless communication device when the wireless communication device determines that the beacon was received from a current base station that it is currently associated with, whether the estimated uplink received signal strength for the current base station is greater than the minimum uplink signal strength automatic roaming threshold value; and scanning, at the wireless communication device, for said each base station when the wireless communication device determines that the beacon was not received from the base station or that the estimated uplink signal strength is not greater than the minimum uplink RSSauto-roam threshold value.

4. The method according to claim 3, further comprising:
determining, at the wireless communication device, whether an actual transmit power of the wireless communication device is less than a highest rated transmit power value for the wireless communication device; and when the wireless communication device determines that the actual transmit power of the wireless communication device is set to the highest rated transmit power value for the wireless communication device, determining at the wireless communication device whether the automatic roaming is enabled.

5. The method according to claim 4, further comprising:
when the wireless communication device determines that the automatic roaming is enabled, determining, at the wireless communication device, whether the estimated uplink signal strength at the current base station is greater than or equal to the minimum uplink RSSauto-roam threshold value required by the wireless communication device to stay with its current base station.

6. The method according to claim 5, further comprising:
when the wireless communication device determines that the estimated uplink signal strength at the current base station is greater than or equal to the minimum uplink RSSauto-roam threshold value, determining, at the wireless communication device, whether the beacon has been received from the current base station.

7. The method according to claim 1, wherein the step of computing the estimated uplink signal strength value for the particular base station, comprises:
when the beacon is received from the particular base station, computing, at the wireless communication device, an estimated uplink signal strength value for the base station based on the effective radiated power information received in that beacon, a value of the received signal strength measured by the wireless communication device for that particular base station, and an actual transmit power of the wireless communication device.

8. The method according to claim 1, further comprising:
storing, at the wireless communication device, the normalized received signal strength value for each particular base station in a normalized RSS sort list;

when all of said base stations specified in the list have been scanned for, ordering the base stations in the descending order from highest normalized received signal strength value to lowest normalized received signal strength value in the normalized RSS sort list stored at the wireless communication device; and when all of said base stations specified in the list have been scanned for, selecting, at the wireless communication device, one of the base stations that has a highest normalized received signal strength value as a new base station the wireless communication device will roam to and associate with.

9. The method according to claim 8, further comprising:
maintaining, at the wireless communication device, an automatic roaming database at the wireless communication device that comprises the estimated uplink signal strength and the normalized signal strength value for said each base station.

10. The method according to claim 9, wherein the automatic roaming database maintained at the wireless communication device, comprises:
a frequency that is unique for said each base station;
a color code that is unique for said each base station;
an availability status for said each base station;
the effective radiated power for said each base station;
the estimated uplink signal strength that would be measured at said each base station;
a minimum uplink signal strength automatic roaming threshold for said each base station; and
a normalized signal strength for each base station that corresponds to the estimated uplink signal strength and the minimum uplink signal strength automatic roaming threshold for said each base station.

11. The method according to claim 1, wherein the estimated uplink signal strength is the received signal strength that the particular base station would measure for signals received from the wireless communication device.

12. The method according to claim 8, wherein the normalized received signal strength value for each particular base station indicates an amount of margin that the estimated uplink signal strength has over the minimum uplink RSSauto-roam threshold value such that larger values of normalized signal strength indicate better uplink signal reception than smaller values of normalized signal strength.

13. The method according to claim 1, further comprising:
after detecting one or more of said base stations during the scanning, measuring, at the wireless communication device, a downlink received signal strength value for each base station that is detected; and
updating, at the wireless communication device, the effective radiated power information and the other parameter for said each base station that is detected.

14. The method according to claim 1, wherein the other parameter comprises a minimum uplink signal strength threshold value, and further comprising:
determining, at the wireless communication device, that the wireless communication device is within uplink transmission range of the particular base station when the wireless communication device determines that the estimated uplink signal strength measured at the particular base station is greater than the minimum uplink signal strength threshold value.

15. A wireless communication device, comprising:
a receiver that is configured to sequentially scan for a beacon transmitted from base stations;
a processor, coupled to the receiver, wherein the processor is configured to measure a downlink received signal strength value for each particular of said base stations that the beacon is received from, wherein the processor is configured to update effective radiated power information and other parameter, wherein the other parameter comprises a minimum uplink signal strength for an automatic roaming, RSSauto-roam, threshold value, for said each particular base station that the wireless communication device receives the beacon from, and wherein the processor is configured to compute an estimated uplink signal strength corresponding to the effective radiated power information for said each particular base station, and wherein the processor is further configured to compute a normalized received signal strength value for said each particular base station by determining a difference between the estimated uplink signal strength for the particular base station and a minimum uplink RSSauto-roam threshold value required by the wireless communication device, and enabling automatic roaming when the estimated uplink signal strength is less than the minimum uplink automatic roaming, RSSauto-roam, threshold value.

16. The wireless communication device according to claim 15, wherein the processor is configured to determine whether the computed normalized received signal strength value for said each particular base station is greater than zero each time the normalized received signal strength value is computed for the particular base station, and wherein the processor is configured to select a first base station that is determined to have the computed normalized received signal strength value that is greater than zero as a new base station the wireless communication device will roam to and associate with.

17. The wireless communication device according to claim 15, wherein the processor is configured to compute the estimated uplink signal strength value for said each particular base station based on the effective radiated power information received in the beacon, wherein the processor is configured to determine a value of the received signal strength measured by the wireless communication device for said particular base station, and wherein the processor is configured to determine an actual transmit power of the wireless communication device.

18. The wireless communication device according to claim 15, wherein the other parameter comprises a minimum uplink signal strength automatic roaming threshold value required by the wireless communication device to stay associated with said each particular base station, wherein the normalized received signal strength value for said each particular base station is the difference between the estimated uplink signal strength for the particular base station and the minimum uplink signal strength automatic roaming threshold value required by the wireless communication device, and wherein the wireless communication device further comprises:

memory that is configured to store the normalized received signal strength value for said each particular base station in a normalized received signal strength list.

19. The wireless communication device according to claim 18, when all of said base stations have been scanned for, wherein the processor is configured to select one of the base stations that has a highest normalized received signal strength value as a new base station that the wireless communication device will roam to and associate with.

* * * * *